US012624681B2

(12) United States Patent
Thatte

(10) Patent No.: US 12,624,681 B2
(45) Date of Patent: May 12, 2026

(54) GEOTHERMAL POWER GENERATION SYSTEMS WITH PRESSURE EXCHANGERS

(71) Applicant: Energy Recovery, Inc., San Leandro, CA (US)

(72) Inventor: Azam Mihir Thatte, Kensington, CA (US)

(73) Assignee: Energy Recovery, Inc., San Leandro, CA (US)

(*) Notice: Subject to any disclaimer, the term of this patent is extended or adjusted under 35 U.S.C. 154(b) by 0 days.

(21) Appl. No.: 18/867,137

(22) PCT Filed: May 19, 2023

(86) PCT No.: PCT/US2023/023009
§ 371 (c)(1),
(2) Date: Nov. 19, 2024

(87) PCT Pub. No.: WO2023/229950
PCT Pub. Date: Nov. 30, 2023

(65) Prior Publication Data
US 2025/0215861 A1 Jul. 3, 2025

Related U.S. Application Data

(60) Provisional application No. 63/345,789, filed on May 25, 2022.

(51) Int. Cl.
*F03G 4/02* (2006.01)
*F01K 25/10* (2006.01)
(Continued)

(52) U.S. Cl.
CPC .............. *F03G 4/02* (2021.08); *F01K 25/103* (2013.01); *F04F 13/00* (2013.01); *F24T 50/00* (2018.05)

(58) Field of Classification Search
CPC .. F03G 4/02; F01K 25/103; F01K 7/32; F04F 13/00; F24T 50/00; F02C 1/10
See application file for complete search history.

(56) References Cited

U.S. PATENT DOCUMENTS

2009/0293502 A1 12/2009 Vandor
2010/0024423 A1* 2/2010 McGinnis ............... F03G 7/015
60/649

(Continued)

OTHER PUBLICATIONS

Flowserve FLEX., "The Next Generation ERD," Version 1.03 FLEX, Flowserve, 8 Pages.

(Continued)

*Primary Examiner* — Hoang M Nguyen
(74) *Attorney, Agent, or Firm* — Lowenstein Sandler LLP

(57) ABSTRACT

A system includes a pressure exchanger (PX) configured to receive a first fluid via a first inlet and a second fluid via a second inlet. The PX is to exchange pressure between the first fluid and the second fluid and provide the first fluid at a first outlet and the second fluid at a second outlet. The system further includes a heat exchanger to exchange corresponding thermal energy between the first fluid and the second fluid. The system further includes a turbine configured to receive the second fluid output from the first heat exchanger and convert corresponding energy of the second fluid into rotational kinetic energy.

20 Claims, 15 Drawing Sheets

(51) Int. Cl.
    *F04F 13/00*        (2009.01)
    *F24T 50/00*        (2018.01)

(56)                References Cited

U.S. PATENT DOCUMENTS

| | | | |
|---|---|---|---|
| 2010/0183903 A1* | 7/2010 | McGinnis | C02F 1/16 |
| | | | 429/50 |
| 2015/0159516 A1* | 6/2015 | Spadacini | F01K 25/08 |
| | | | 60/671 |
| 2016/0348539 A1 | 12/2016 | Peter et al. | |
| 2018/0347601 A1 | 12/2018 | Hoffman et al. | |
| 2019/0390576 A1 | 12/2019 | Thatte | |
| 2022/0397310 A1* | 12/2022 | Thatte | F25B 30/02 |
| 2024/0035452 A1* | 2/2024 | Weiss | F03G 4/026 |

OTHER PUBLICATIONS

International Search Report and Written Opinion for International Application No. PCT/US0023/023009, mailed Jul. 31, 2023, 14 Pages.

* cited by examiner

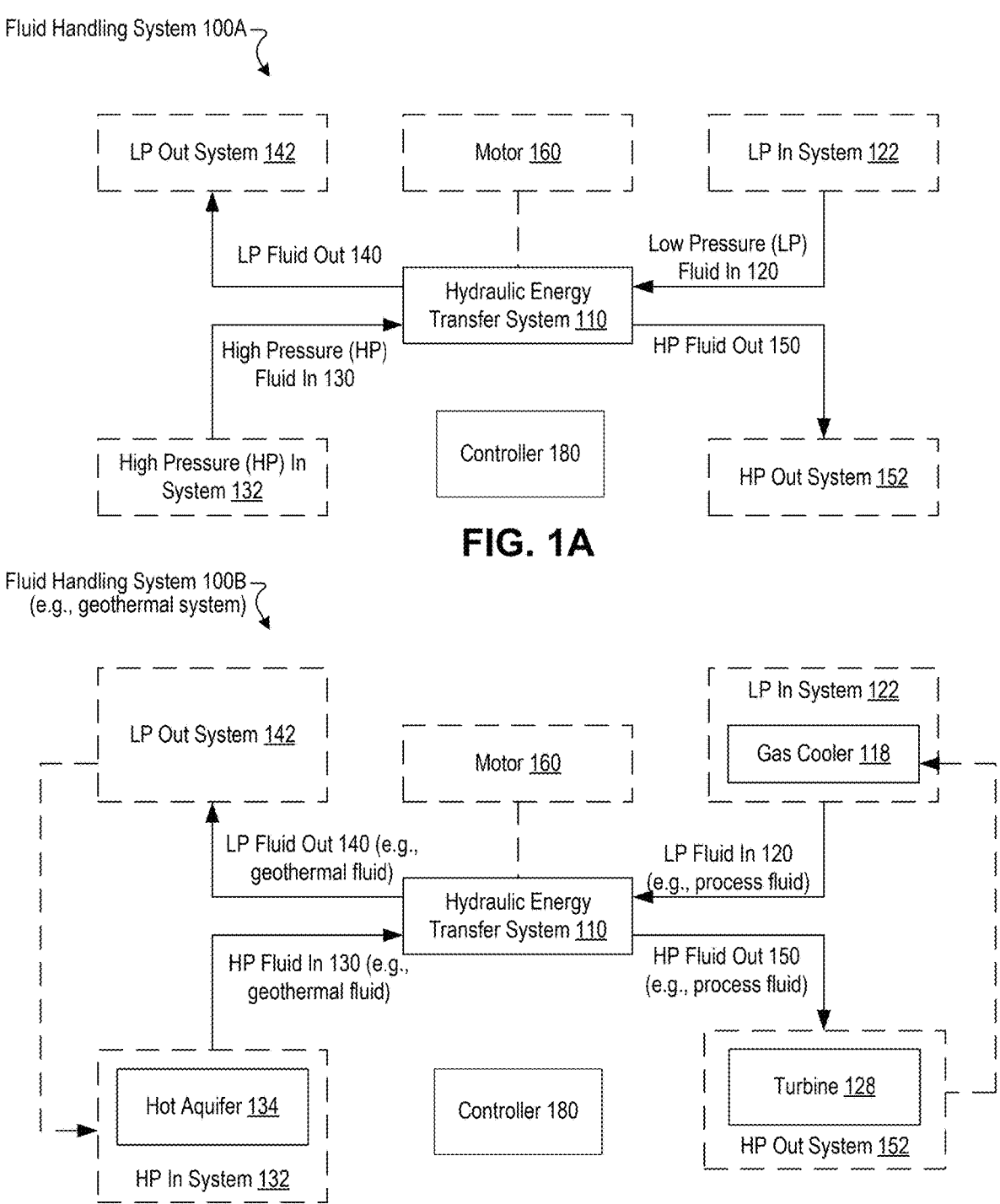

Fluid Handling System 100A

LP Out System 142

Motor 160

LP In System 122

LP Fluid Out 140

Low Pressure (LP) Fluid In 120

Hydraulic Energy Transfer System 110

High Pressure (HP) Fluid In 130

HP Fluid Out 150

Controller 180

High Pressure (HP) In System 132

HP Out System 152

FIG. 1A

Fluid Handling System 100B (e.g., geothermal system)

LP Out System 142

Motor 160

LP In System 122

Gas Cooler 118

LP Fluid Out 140 (e.g., geothermal fluid)

LP Fluid In 120 (e.g., process fluid)

Hydraulic Energy Transfer System 110

HP Fluid In 130 (e.g., geothermal fluid)

HP Fluid Out 150 (e.g., process fluid)

Hot Aquifer 134

HP In System 132

Controller 180

Turbine 128

HP Out System 152

GEOTHERMAL POWER GENERATION SYSTEMS WITH PRESSURE EXCHANGERS

RELATED APPLICATIONS

This application claims the benefit under 35 U.S.C. § 371 of International Patent Application No. PCT/US2023/023009, filed May 19, 2023, that claims priority to U.S. Provisional Application No. 63/345,789, filed May 25, 2022, the contents of each are hereby incorporated by reference in their entirety.

TECHNICAL FIELD

The present disclosure relates to geothermal power generation systems, and, more particularly, geothermal power generation systems with pressure exchangers.

BACKGROUND

Systems use fluids at different pressures. Pumps and/or compressors may be used to increase pressure of fluids used by systems.

BRIEF DESCRIPTION OF THE DRAWINGS

The present disclosure is illustrated by way of example, and not by way of limitation in the figures of the accompanying drawings.

FIGS. 1A-B illustrate schematic diagrams of fluid handling systems including hydraulic energy transfer systems, according to certain embodiments.

DETAILED DESCRIPTION OF EMBODIMENTS

Figure 2A:
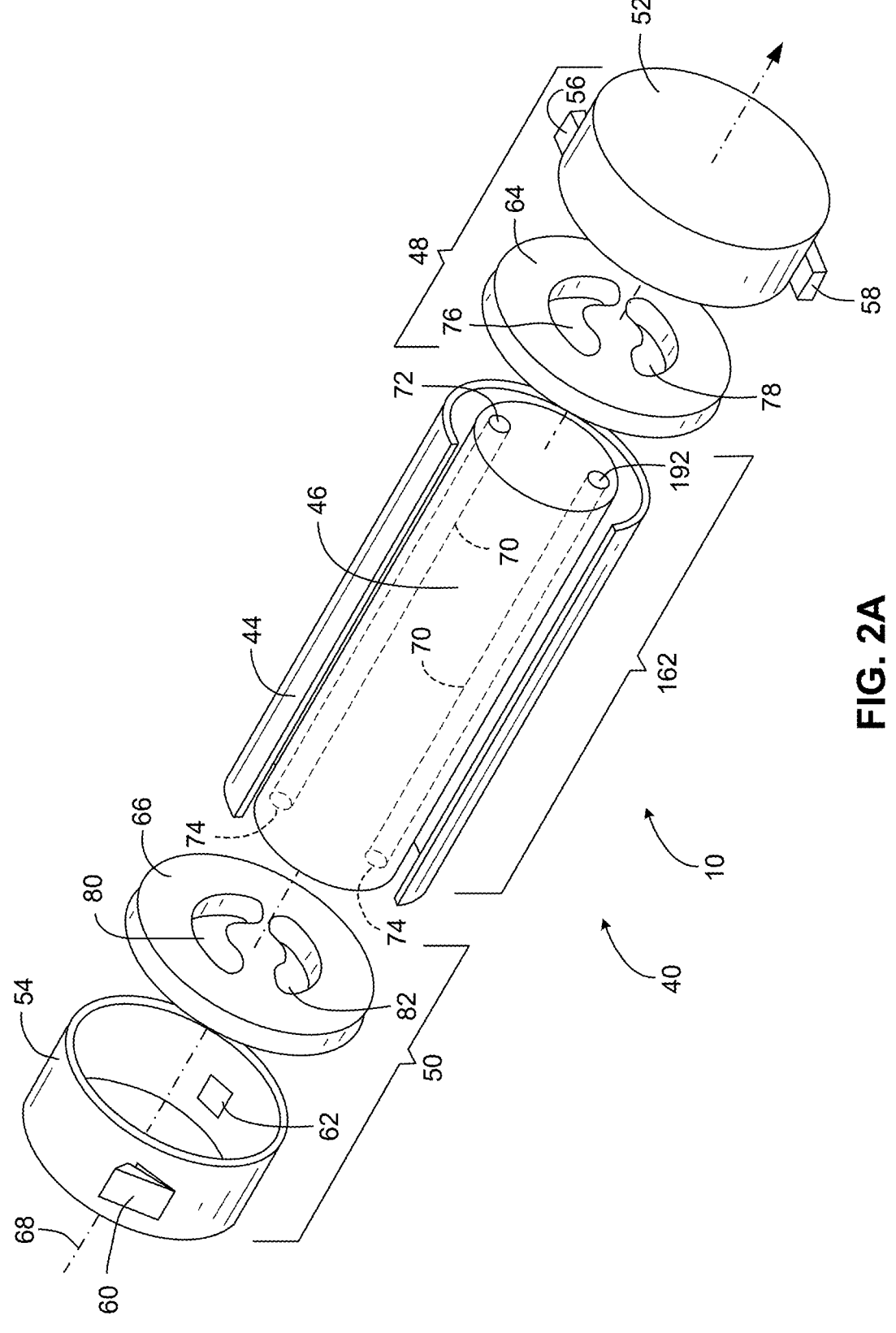
FIGS. 2A-E are exploded perspective views of pressure exchangers (PXs), according to certain embodiments.

Embodiments described herein are related to geothermal power generation systems (e.g., geothermal fluid handling systems, energy generating systems that include a pressure exchanger, etc.).

Systems may use fluids at different pressures. These systems may include hydraulic fracturing (e.g., fracking or fracing) systems, desalinization systems, refrigeration systems, heat pump systems, energy generation systems, mud pumping systems, slurry pumping systems, industrial fluid systems, waste fluid systems, fluid transportation systems, geothermal power generation systems, ground source systems, etc. Pumps or compressors may be used to increase pressure of fluid to be used by systems.

Conventionally, geothermal systems (e.g., ground source, geothermal heat pump, ground source heat pump, etc.) transfers heat between the ground and the rest of the system. Conventional geothermal system include a geothermal heat pump (e.g., ground source heat pump) is a heating/cooling system for buildings that uses a type of heat pump to transfer heat to or from the ground and uses the relative consistency of temperatures of the Earth through the seasons. Conventional geothermal systems include systems that use heated fluid (e.g., hot water) from a geothermal source (e.g., from within the Earth, a heated portion of the Earth, from a hot aquifer via a production well, etc.) to heat and/or evaporate fluid into steam. The steam can be used to spin a turbine and the spinning turbine can then be used to generate electricity. Conventional geothermal systems decrease the pressure of hot, high pressure geothermal fluid from a production well to a low pressure before introducing the hot geothermal fluid into a heat exchanger, where heat is exchanged with the working fluid (e.g., water/steam) used in the turbine. The geothermal fluid is then reinjected into the ground (e.g., via a re-injection well into a hot aquifer). Because of the low temperature of the geothermal fluid received from the production well relative to the operating temperatures of steam turbine systems powered by combustion (e.g., coal-fired steam turbines, etc.), conventional geothermal power generation systems are inefficient. For example, according to the Carnot $$\left(\eta_{max} = 1 - \frac{T_L}{T_H}\right),$$

maximum efficiency remains low when the hot source efficiency temperature (TH) is low. The high pressure of the geothermal fluid received from the production well in a geothermal power generation system can be used to increase efficiency of the system, notwithstanding the low relative temperature of the hot geothermal fluid.

The systems, devices, and methods of the present disclosure provide fluid handling systems (e.g., for geothermal energy production, etc.) that include pressure exchangers (PXs). In some embodiments, a system (e.g., a fluid handling system, a heat transfer system, a geothermal power generation system, etc.) includes a PX that is configured to exchange pressure between a first fluid (e.g., high pressure geothermal fluid, such as water and/or brine) and a second fluid (e.g., a low pressure portion of a working fluid in a turbine cycle, low pressure $CO_2$, supercritical $CO_2$, etc.). In some embodiments, the PX may receive the first fluid at a first pressure via a first inlet (e.g., a high pressure inlet) and the second fluid at a second pressure via a second inlet (e.g., a low pressure inlet). The PX may exchange pressure between the first fluid and the second fluid. The first fluid may exit the PX at a third pressure via a first outlet (e.g., a low pressure outlet) and the second fluid may exit the PX at a fourth pressure via a second outlet (e.g., a high pressure outlet). The first pressure may be higher than the second pressure and the third pressure may be lower than the fourth pressure.

In some embodiments, the system includes a heat exchanger (e.g., a primary heat exchanger) configured to exchanger corresponding thermal energy between the first fluid and the second fluid. In some embodiments, the first fluid transfers (e.g., loses) heat to the second fluid (e.g., via the heat exchanger). In some embodiments, the heat exchanger is disposed downstream from the PX on a flow path of the first fluid and downstream from the PX on a flow path of the second fluid. In some embodiments, the heat exchanger is disposed upstream from the PX on a flow path of the first fluid. The second fluid may enter the heat exchanger at high pressure (e.g., near the fourth pressure at which the second fluid may exit the PX via the high pressure outlet of the PX) and may leave the heat exchanger at an increased temperature. In some embodiments, the second fluid is heated in the heat exchanger while the second fluid is in a supercritical state (e.g., supercritical $CO_2$).

In some embodiments, the system includes a turbine. The turbine may receive the second fluid from the heat exchanger (e.g., at high pressure and at an increased temperature). The turbine may convert corresponding energy (e.g., kinetic energy, pressure, thermal energy, etc.) of the second fluid into rotational energy (e.g., rotational kinetic energy). In some embodiments, the turbine drives a generator that can be used to generate electricity. Second fluid at decreased pressure and temperature may exit the turbine and flow toward the second inlet of the PX to again be compressed in the PX and sent again to the heat exchanger, completing the turbine cycle. In some embodiments, the turbine is configured to receive and/or provide a supercritical fluid, such as supercritical $CO_2$.

The systems, devices, and methods of the present disclosure have advantages over conventional solutions. The geothermal power generation systems of the present disclosure may have an increased efficiency when compared to conventional systems. For example, the systems described herein use both the high temperature and the high pressure of the geothermal fluid received from the geothermal source (e.g., below ground) to increase temperature and pressure of a working fluid to drive a turbine. In some embodiments, by using a PX, the systems described herein reduce energy consumed to increase pressure of a working fluid to a supercritical state to drive a turbine. In some embodiments, the present disclosure provides for reduced wear on components (e.g., pumps, compressors, etc.) compared to conventional systems because pumps and compressors are run more efficiently compared to conventional systems (e.g., the PX performs at least a portion of the increasing of pressure of the second fluid). This also allows systems described herein to have increased reliability, less maintenance, increased component service life, decreased system downtime, and increased yield (e.g., energy produced, etc.).

Although some embodiments of the present disclosure are described in relation to pressure exchangers, energy recovery devices, and hydraulic energy transfer systems, the current disclosure can be applied to other systems and devices (e.g., pressure exchanger that is not isobaric, rotating components that are not a pressure exchanger, a pressure exchanger that is not rotary, systems that do not include pressure exchangers, etc.).

Although some embodiments of the present disclosure are described in relation to exchanging pressure between fluid used in fracing systems, desalinization systems, geothermal power generation systems, heat pump systems, and/or refrigeration systems, the present disclosure can be applied to other types of systems. Fluids can refer to liquid, gas, transcritical fluid, supercritical fluid, subcritical fluid, and/or combinations thereof.

Although some embodiments of the present disclosure are described in relation to receiving hot, high pressure fluid (e.g., brine and/or water) from the ground (e.g., hot aquifer), the present disclosure can receive other types of fluids (e.g., lower temperature, lower pressure, etc.) from the ground (e.g., below ground surface level).

Although some embodiments of the present disclosure are described in relation to receiving fluid from a hot source (e.g., hot aquifer) below the ground surface, the present disclosure can receive fluid from other sources (e.g., environmental ground temperature) below the ground surface.

FIG. 1A illustrates a schematic diagram of a fluid handling system 100A that includes a hydraulic energy transfer system 110, according to certain embodiments.

In some embodiments, a hydraulic energy transfer system 110 includes a pressure exchanger (e.g., PX). The hydraulic energy transfer system 110 (e.g., PX) receives low pressure (LP) fluid in 120 (e.g., via a low-pressure inlet) from an LP in system 122. The hydraulic energy transfer system 110 also receives high pressure (HP) fluid in 130 (e.g., via a high-pressure inlet) from HP in system 132. In some embodiments, HP in system 132 includes a source of hot, high pressure geothermal fluid (e.g., a hot aquifer, a geothermal production well, etc.). The hydraulic energy transfer system 110 (e.g., PX) exchanges pressure between the HP fluid in 130 and the LP fluid in 120 to provide LP fluid out 140 (e.g., via low-pressure outlet) to LP fluid out system 142 and to provide HP fluid out 150 (e.g., via high-pressure outlet) to HP fluid out system 152. In some embodiments, HP fluid out system 152 includes a turbine (e.g., as part of a power cycle) to recover energy from HP fluid out 150. A controller 180 may cause an adjustment of flowrates of HP fluid in 130 and LP fluid out.

In some embodiments, the hydraulic energy transfer system 110 includes a PX to exchange pressure between the HP fluid in 130 and the LP fluid in 120. In some embodiments, the PX is substantially or partially isobaric (e.g., an isobaric pressure exchanger (IPX)). The PX may be a device that transfers fluid pressure between HP fluid in 130 and LP fluid in 120 at efficiencies (e.g., pressure transfer efficiencies, substantially isobaric) in excess of approximately 50%, 60%, 70%, 80%, 90%, or greater (e.g., without utilizing centrifugal technology). High pressure (e.g., HP fluid in 130, HP fluid out 150) refers to pressures greater than the low pressure (e.g., LP fluid in 120, LP fluid out 140). LP fluid in 120 of the PX may be pressurized and exit the PX at high pressure (e.g., HP fluid out 150, at a pressure greater than that of LP fluid in 120), and HP fluid in 130 may be depressurized and exit the PX at low pressure (e.g., LP fluid out 140, at a pressure less than that of the HP fluid in 130). The PX may operate with the HP fluid in 130 directly applying a force to pressurize the LP fluid in 120, with or without a fluid separator between the fluids. Examples of fluid separators that may be used with the PX include, but are not limited to, pistons, bladders, diaphragms and the like. In some embodiments, PXs may be rotary devices. Rotary PXs, such as those manufactured by Energy Recovery, Inc. of San Leandro, Calif., may not have any separate valves, since the effective valving action is accomplished internal to the device via the relative motion of a rotor with respect to end covers. Rotary PXs may be designed to operate with internal pistons to isolate fluids and transfer pressure with relatively little mixing of the inlet fluid streams. Reciprocating PXs may include a piston moving back and forth in a cylinder for transferring pressure between the fluid streams. Any PX or multiple PXs may be used in the present disclosure, such as, but not limited to, rotary PXs, reciprocating PXs, or any combination thereof. In addition, the PX may be disposed on a skid separate from the other components of a fluid handling system 100 (e.g., in situations in which the PX is added to an existing fluid handling system). For example, the PX may be fastened to a structure that can be moved from one site to another. The PX may be coupled to a system (e.g., pipes of a system, etc.) that has been built on-site. The structure to which the PX is fastened may be referred to as a 'skid.'

In some embodiments, a motor 160 is coupled to hydraulic energy transfer system 110 (e.g., to a PX). In some embodiments, the motor 160 controls the speed (e.g., rotational speed, angular velocity, etc.) of a rotor of the hydraulic energy transfer system 110 (e.g., to increase pressure of HP fluid out 150, to decrease pressure of HP fluid out 150, etc.). In some embodiments, motor 160 generates energy (e.g., acts as a generator) based on pressure exchanging in hydraulic energy transfer system 110.

The hydraulic energy transfer system 110 may include a hydraulic turbocharger or hydraulic pressure exchanger, such as a rotating PX. The PX may include one or more chambers (e.g., 1 to 100) to facilitate pressure transfer between first and second fluids (e.g., gas, liquid, multi-phase fluid). In some embodiments, the PX may transfer pressure between a first fluid (e.g., pressure exchange fluid, such as a proppant free fluid, substantially proppant free fluid, lower viscosity fluid, fluid that has lower than a threshold amount of certain chemicals, non-caustic fluid, non-acidic fluid, etc.) and a second fluid that may have a higher viscosity (e.g., be highly viscous), include more than a threshold amount of certain chemicals (e.g., a caustic fluid, an acidic fluid, etc.), and/or contain solid particles (e.g., geothermal fluid, frac fluid containing sand, proppant, powders, debris, ceramics, etc.).

Fluid handling system 100A may additionally include one or more sensors to provide sensor data (e.g., flowrate data, pressure data, velocity data, etc.) associated with the fluids of fluid handling system 100A. Controller 180 may control one or more flow rates of fluid handling system 100A based on the sensor data. In some embodiments, controller 180 causes one or more flow valves to actuate based on sensor data received. In some embodiments, the controller 180 can perform the method of FIG. 9.

One or more components of the hydraulic energy transfer system 110 may be used in different types of systems, such as geothermal power generation systems, fracing systems, desalination systems, refrigeration and heat pump systems, slurry pumping systems, industrial fluid systems, waste fluid systems, fluid transportation systems, heat transfer systems, etc.

FIG. 1B illustrates a schematic diagram of a fluid handling system 100B including a hydraulic energy transfer system 110, according to certain embodiments. Fluid handling system 100B may be a geothermal power generation system. In some embodiments, fluid handling system 100B includes more components, less components, same routing, different routing, and/or the like than that shown in FIG. 1B. Some of the features in FIG. 1B that have similar reference numbers as those in FIG. 1A may have similar properties, functions, and/or structures as those in FIG. 1A.

HP fluid in 130 and LP fluid out 140 may be geothermal fluid (e.g., particle-containing fluid, hot water, hot geothermal brine, etc.). LP fluid in 120 and HP fluid out 150 may be process fluid (e.g., proppant free fluid, water, filtered fluid, $CO_2$, supercritical $CO_2$, hydrofluorocarbons such as R134a, R245fa, hydrocarbons such as isobutene, pentane, propane, etc.).

LP in system 122 may include one or more low pressure fluid pumps and/or compressors to provide LP fluid in 120 to the hydraulic energy transfer system 110 (e.g., PX). HP in system 132 may include a hot aquifer 134 to provide HP fluid in 130 to hydraulic energy transfer system 110. In some embodiments, HP fluid in 130 is received by the hydraulic energy transfer system 110 via a production well in fluid communication with the hot aquifer 134. Controller 180 may control one or more components of fluid handling system 100B.

Hydraulic energy transfer system 110 exchanges pressure between LP fluid in 120 (e.g., low pressure process fluid, low pressure $CO_2$, etc.) and HP fluid in 130 (e.g., high pressure geothermal fluid, high pressure hot water, etc.) to provide HP fluid out 150 (e.g., high pressure process fluid, high pressure $CO_2$, etc.) to HP out system 152 and to provide LP fluid out 140 (e.g., low pressure geothermal fluid, low pressure hot water, etc.) to LP out system 142. In some embodiments, HP out system 152 includes a turbine 128 to receive the HP fluid out 150. The turbine 128 may convert thermal energy in HP fluid out 150 into kinetic energy and provide fluid to the LP in system 122. The turbine 128 may be mechanically coupled to a generator to produce electricity. In some embodiments, the fluid from the turbine 128 is cooled in a gas cooler 118 of the LP in system 122 to form LP fluid in 120. In some embodiments, LP fluid out 140 is provided to a heat exchanger to exchange thermal energy (e.g., exchange heat, provide heat, etc.) with HP fluid out 150. Heated HP fluid 150 may be provided to the turbine 128. Cooled LP fluid out 140 may be provided to HP in system 132 by reinjection into the hot aquifer 134 (e.g., via a reinjection well).

Fluid handling system 100B may additionally include one or more sensors configured to provide sensor data associated with the fluid. One or more flow valves may control flowrates of the fluid based on sensor data received from the one or more sensors. In some embodiments, controller 180 causes one or more flow valves (not illustrated) to actuate based on sensor data received.

FIGS. 2A-E are exploded perspective views a rotary PX 40 (e.g., rotary pressure exchanger, rotary liquid piston compressor (LPC)), according to certain embodiments. Some of the features in one or more of FIGS. 2A-E may have similar properties, functions, and/or structures as those in one or more of FIGS. 1A-D.

PX 40 is configured to transfer pressure and/or work between a first fluid (e.g., geothermal fluid, water and/or brine, slurry fluid, caustic fluid, acidic fluid, frac fluid, superheated gaseous carbon dioxide, HP fluid in 130) and a second fluid (e.g., process fluid, particle free fluid, non-caustic fluid, non-acidic fluid, proppant free fluid or supercritical carbon dioxide, LP fluid in 120) with minimal mixing of the fluids. The rotary PX 40 may include a generally cylindrical body portion 42 that includes a sleeve 44 (e.g., rotor sleeve) and a rotor 46. The rotary PX 40 may also include two end caps 48 and 50 that include manifolds 52 and 54, respectively. Manifold 52 includes respective inlet port 56 and outlet port 58, while manifold 54 includes respective inlet port 60 and outlet port 62. In operation, these inlet ports 56, 60 enable the first and second fluids to enter the rotary PX 40 to exchange pressure, while the outlet ports 58, 62 enable the first and second fluids to then exit the rotary PX 40. In operation, the inlet port 56 may receive a high-pressure first fluid (e.g., HP fluid in 130), and after exchanging pressure, the outlet port 58 may be used to route a low-pressure first fluid (e.g., LP fluid out 140) out of the rotary PX 40. Similarly, the inlet port 60 may receive a low-pressure second fluid (e.g., low pressure slurry fluid, LP fluid in 120) and the outlet port 62 may be used to route a high-pressure second fluid (e.g., high pressure slurry fluid, HP fluid out 150) out of the rotary PX 40. The end caps 48 and 50 include respective end covers 64 and 66 (e.g., end plates) disposed within respective manifolds 52 and 54 that enable fluid sealing contact with the rotor 46.

One or more components of the PX 40, such as the rotor 46, the end cover 64, and/or the end cover 66, may be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). For example, tungsten carbide may be more durable and may provide improved wear resistance to abrasive fluids as compared to other materials, such as alumina ceramics. Additionally, in some embodiments, one or more components of the PX 40, such as the rotor 46, the end cover 64, the end cover 66, and/or other sealing surfaces of the PX 40, may include an insert. In some embodiments, the inserts may be constructed from one or more wear-resistant materials (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more) to provide improved wear resistance.

The rotor 46 may be cylindrical and disposed in the sleeve 44, which enables the rotor 46 to rotate about the axis 68. The rotor 46 may have a plurality of channels 70 (e.g., ducts, rotor ducts) extending substantially longitudinally through the rotor 46 with openings 72 and 74 (e.g., rotor ports) at each end arranged symmetrically about the longitudinal axis 68. The openings 72 and 74 of the rotor 46 are arranged for hydraulic communication with inlet and outlet apertures 76 and 78 (e.g., end cover inlet port and end cover outlet port) and 80 and 82 (e.g., end cover inlet port and end cover outlet port) in the end covers 64 and 66, in such a manner that during rotation the channels 70 are exposed to fluid at high-pressure and fluid at low-pressure. As illustrated, the inlet and outlet apertures 76 and 78 and 80 and 82 may be designed in the form of arcs or segments of a circle (e.g., C-shaped).

In some embodiments, a controller (e.g., controller 180 of FIGS. 1A-B) using sensor data (e.g., revolutions per minute measured through a tachometer or optical encoder or volumetric flow rate measured through flowmeter) may control the extent of mixing between the first and second fluids in the rotary PX 40, which may be used to improve the operability of the fluid handling system (e.g., fluid handling systems 100A-B of FIGS. 1A-B). In some examples, varying the volumetric flow rates of the first and/or second fluids entering the rotary PX 40 allows the operator (e.g., system operator, plant operator) to control the amount of fluid mixing within the PX 40. In addition, varying the rotational speed of the rotor 46 (e.g., via a motor) also allows the operator to control mixing. Three characteristics of the rotary PX 40 that affect mixing are: (1) the aspect ratio of the rotor channels 70; (2) the duration of exposure between first and second fluids; and (3) the creation of a fluid barrier (e.g., an interface) between the first and second fluids within the rotor channels 70. First, the rotor channels 70 (e.g., ducts) are generally long and narrow, which stabilizes the flow within the rotary PX 40. In addition, the first and second fluids may move through the channels 70 in a plug flow regime with minimal axial mixing. Second, in certain embodiments, the speed of the rotor 46 reduces contact between the first and second fluids. For example, the speed of the rotor 46 (e.g., rotor speed of approximately 1200 revolutions per minute (RPM)) may reduce contact times between the first and second fluids to less than approximately 0.15 seconds, 0.10 seconds, or 0.05 seconds. Third, a small portion of the rotor channel 70 is used for the exchange of pressure between the first and second fluids. Therefore, a volume of fluid remains in the channel 70 as a barrier between the first and second fluids. All these mechanisms may limit mixing within the rotary PX 40. Moreover, in some embodiments, the rotary PX 40 may be designed to operate with internal pistons or other barriers (e.g., physical barrier), either complete or partial, that isolate the first and second fluids while enabling pressure transfer.

FIGS. 2B-2E are exploded views of an embodiment of the rotary PX 40 illustrating the sequence of positions of a single rotor channel 70 in the rotor 46 as the channel 70 rotates through a complete cycle. It is noted that FIGS. 2B-2E are simplifications of the rotary PX 40 showing one rotor channel 70, and the channel 70 is shown as having a circular cross-sectional shape. In other embodiments, the rotary PX 40 may include a plurality of channels 70 with the same or different cross-sectional shapes (e.g., circular, oval, square, rectangular, polygonal, etc.). Thus, FIGS. 2B-2E are simplifications for purposes of illustration, and other embodiments of the rotary PX 40 may have configurations different from those shown in FIGS. 2A-2E. As described in detail below, the rotary PX 40 facilitates pressure exchange between first and second fluids (e.g., a hot geothermal fluid and a process fluid) by enabling the first and second fluids to briefly contact each other within the rotor 46. In some embodiments, the PX facilitates pressure exchange between first and second fluids by enabling the first and second fluids to contact opposing sides of a barrier (e.g., a reciprocating barrier, a piston, not shown). In certain embodiments, this exchange happens at speeds that result in limited mixing of the first and second fluids. The speed of the pressure wave traveling through the rotor channel 70 (as soon as the channel is exposed to the aperture 76), the diffusion speeds of the fluids, and/or the rotational speed of rotor 46 may dictate whether any mixing occurs and to what extent.

Figures 2B, 2C, 2D, 2E:
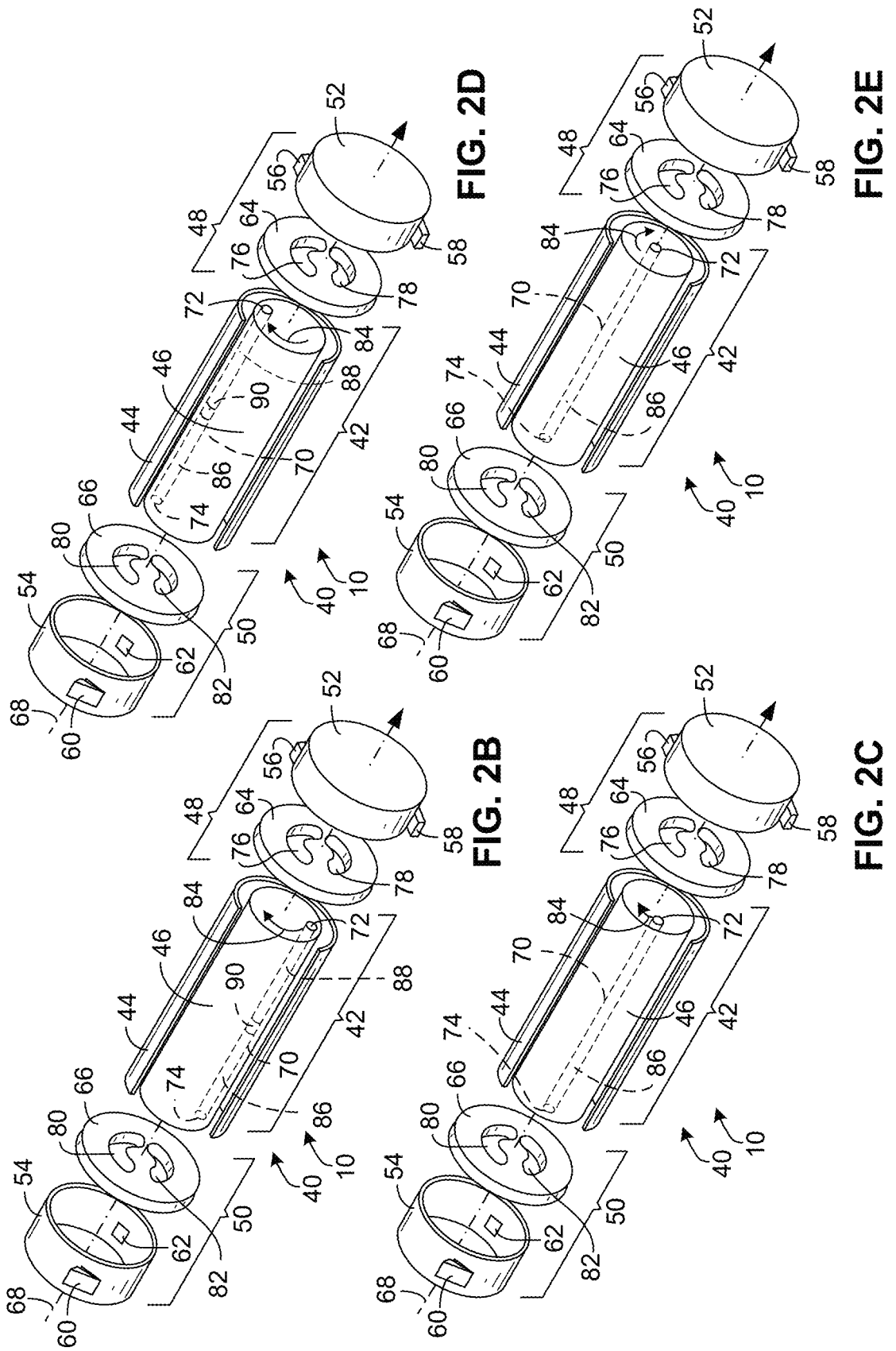

FIG. 2B is an exploded perspective view of an embodiment of a rotary PX 40 (e.g., rotary LPC), according to certain embodiments. In FIG. 2B, the channel opening 72 is in a first position. In the first position, the channel opening 72 is in fluid communication with the aperture 78 in end cover 64 and therefore with the manifold 52, while the opposing channel opening 74 is in hydraulic communication with the aperture 82 in end cover 66 and by extension with the manifold 54. The rotor 46 may rotate in the clockwise direction indicated by arrow 84. In operation, low-pressure second fluid 86 (e.g., low pressure slurry fluid) passes through end cover 66 and enters the channel 70, where it contacts the first fluid 88 at a dynamic fluid interface 90. The second fluid 86 then drives the first fluid 88 out of the channel 70, through end cover 64, and out of the rotary PX 40. However, because of the short duration of contact, there is minimal mixing between the second fluid 86 (e.g., slurry fluid) and the first fluid 88 (e.g., particulate-free fluid). In some embodiments, low pressure second fluid 86 contacts a first side of a barrier (e.g., a piston, not shown) disposed in channel 70 that is in contact (e.g., on an opposing side of the barrier) by first fluid 88. The second fluid 86 drives the barrier which pushes first fluid 88 out of the channel 70. In such embodiments, there is negligible mixing between the second fluid 86 and the first fluid 88.

FIG. 2C is an exploded perspective view of an embodiment of a rotary PX 40 (e.g., rotary LPC), according to certain embodiments. In FIG. 2C, the channel 70 has rotated clockwise through an arc of approximately 90 degrees. In this position, the opening 74 (e.g., outlet) is no longer in fluid communication with the apertures 80 and 82 of end cover 66, and the opening 72 is no longer in fluid communication with the apertures 76 and 78 of end cover 64. Accordingly, the low-pressure second fluid 86 is temporarily contained within the channel 70.

FIG. 2D is an exploded perspective view of an embodiment of a rotary PX 40 (e.g., rotary LPC), according to certain embodiments. In FIG. 2D, the channel 70 has rotated through approximately 60 degrees of arc from the position shown in FIG. 2B. The opening 74 is now in fluid communication with aperture 80 in end cover 66, and the opening 72 of the channel 70 is now in fluid communication with aperture 76 of the end cover 64. In this position, high-pressure first fluid 88 enters and pressurizes the low-pressure second fluid 86, driving the second fluid 86 out of the rotor channel 70 and through the aperture 80.

FIG. 2E is an exploded perspective view of an embodiment of a rotary PX 40 (e.g., rotary LPC), according to certain embodiments. In FIG. 2E, the channel 70 has rotated through approximately 270 degrees of arc from the position shown in FIG. 2B. In this position, the opening 74 is no longer in fluid communication with the apertures 80 and 82 of end cover 66, and the opening 72 is no longer in fluid communication with the apertures 76 and 78 of end cover 64. Accordingly, the first fluid 88 is no longer pressurized and is temporarily contained within the channel 70 until the rotor 46 rotates another 90 degrees, starting the cycle over again.

Figure 3A:
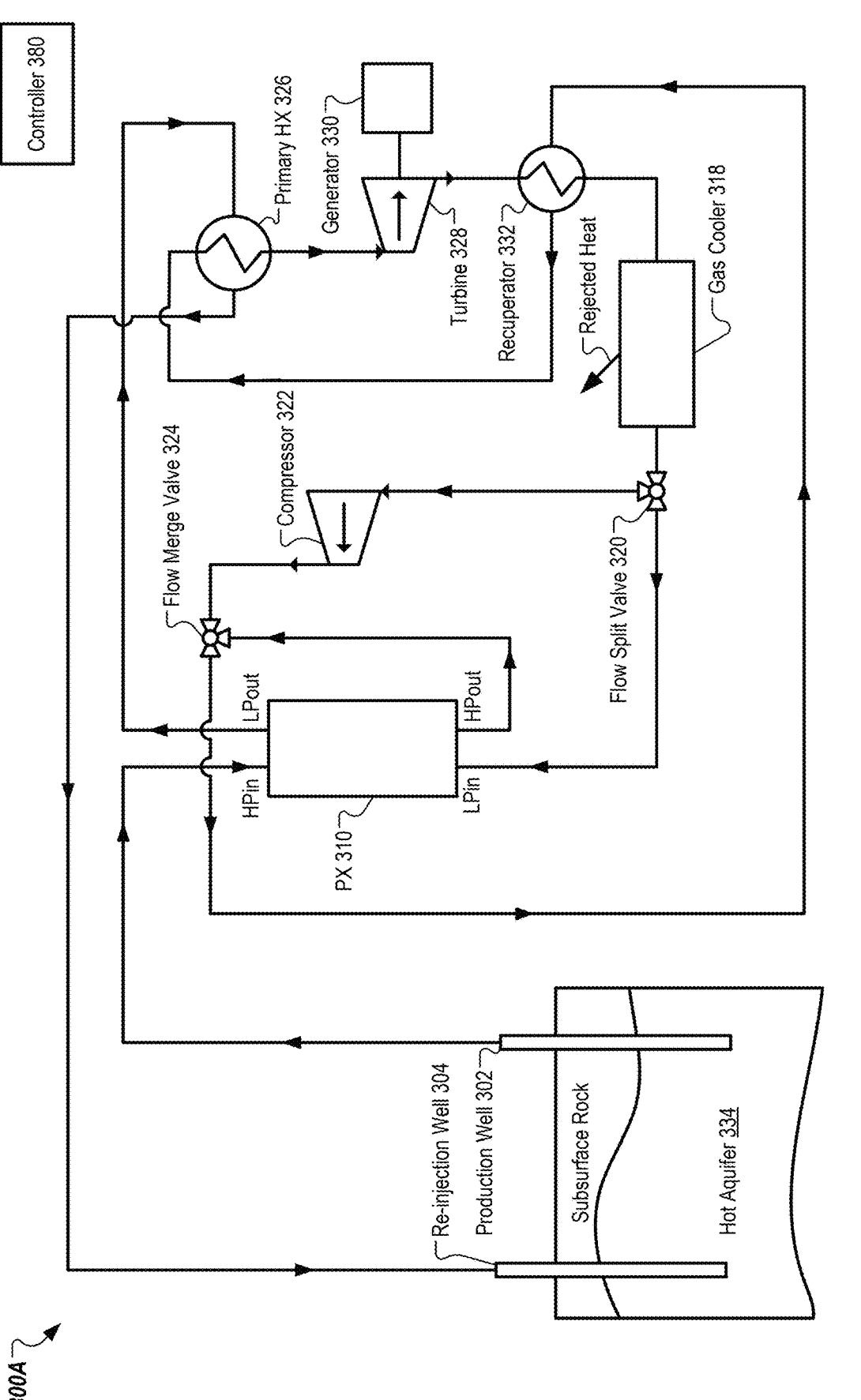
FIGS. 3A-D are schematic diagrams of geothermal power generation systems including PXs, according to certain embodiments.
Figure 3B:
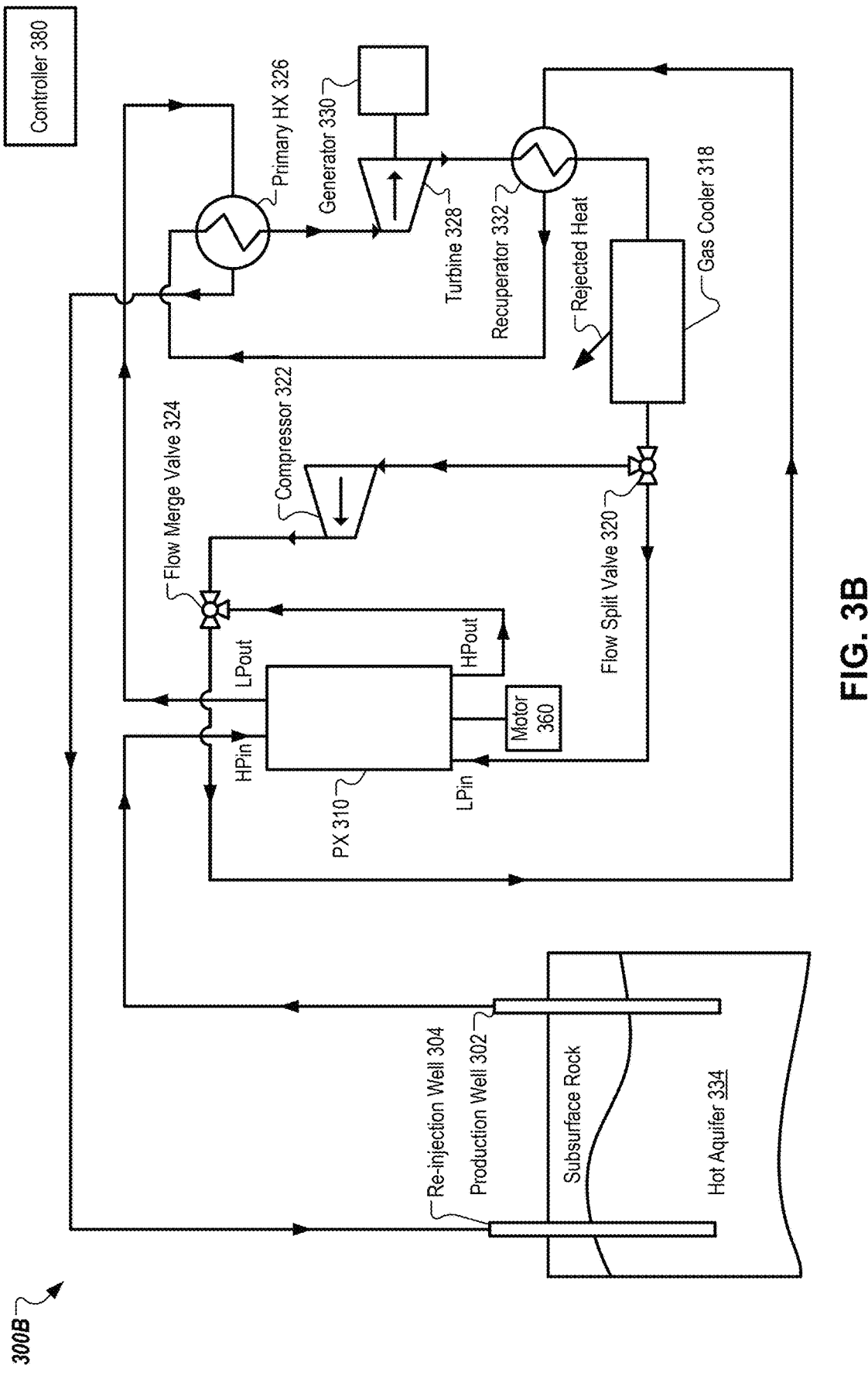
Figure 3C:
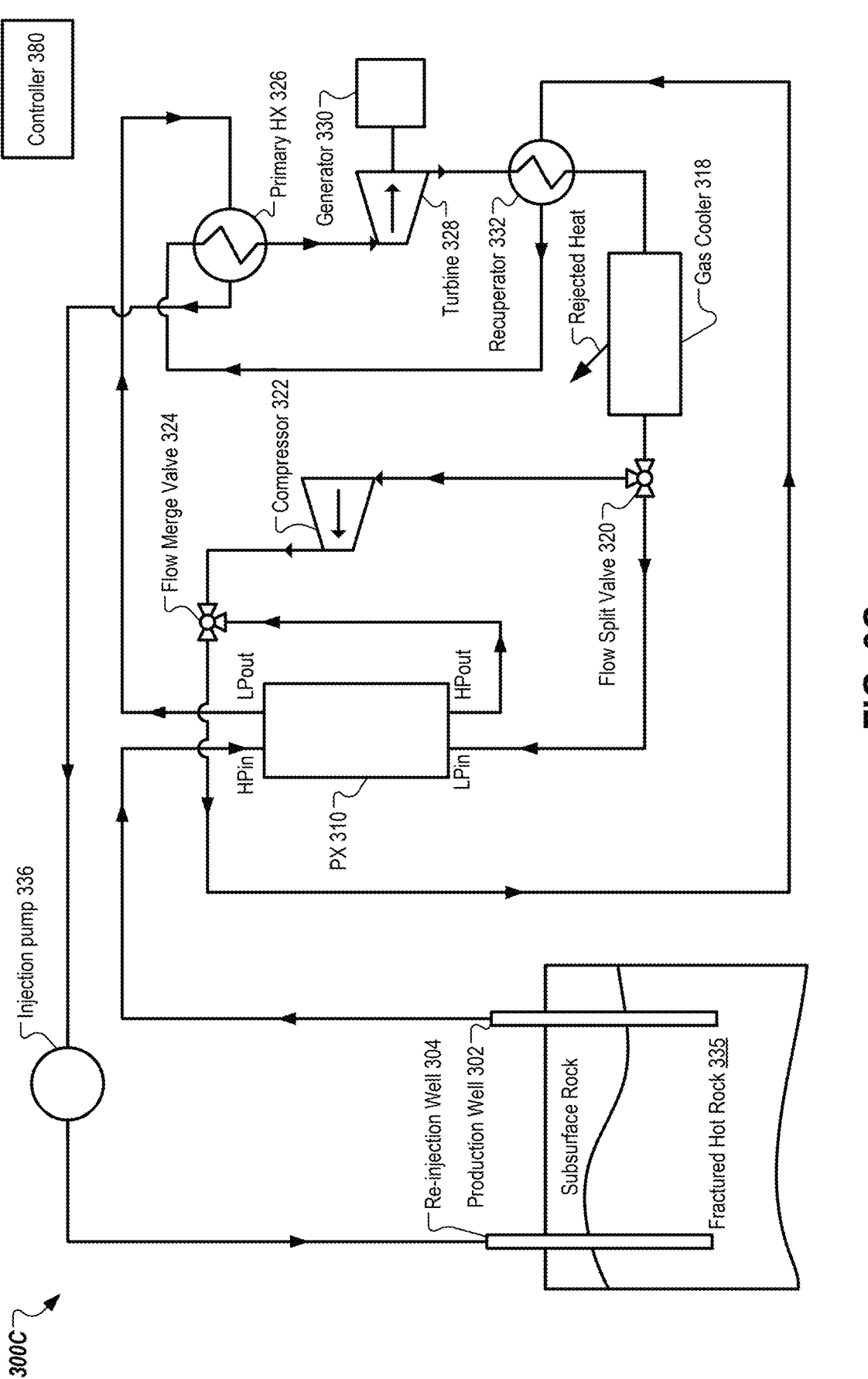

FIGS. 3A-C are schematic diagrams of geothermal power generation systems including PXs, according to certain embodiments. Some of the features in one or more of FIGS. 3A-C may have similar properties, functions, and/or structures as those in one or more of FIGS. 1A-B and/or one or more of FIGS. 2A-E.

FIG. 3A is a schematic diagram of a geothermal power generation system 300A including a pressure exchanger (PX), according to certain embodiments. In some embodiments, a geothermal power generation system includes a pressure exchanger (PX) 310. PX 310 may be a rotary pressure exchanger. In some embodiments, PX 310 is an isobaric or substantially isobaric pressure exchanger. PX 310 may be configured to exchange pressure between a first fluid and a second fluid.

In some embodiments, geothermal power generation system 300A includes a high pressure (HP) source (e.g., HP in system 132 of one or more of FIGS. 1A-D). HP source may be a source of a first fluid. The first fluid may be a geothermal fluid (e.g., water, brine etc.). In some embodiments, the HP source is a hot aquifer 334. Hot aquifer 334 may be below ground beneath a layer of subsurface rock. Hot aquifer 334 may be a ground source of warm fluid. In some embodiments, a production well 302 in fluid communication with the hot aquifer 334 and drilled through the subsurface rock provides hot, high pressure geothermal fluid (e.g., brine and/or water). In some embodiments, geothermal fluid is provided at a pressure between about 150 bar and about 250 bar and at a temperature between about 180 degrees Celsius (° C.) and about 200° C. Hot, high pressure geothermal fluid may flow from the production well 302 to the high pressure inlet of the PX 310. In some embodiments, the PX 310 exchanges pressure between the first fluid (e.g., geothermal fluid) and a second fluid (e.g., process fluid, $CO_2$, hydrofluorocarbons such as R134a, R245fa, hydrocarbons such as isobutene, pentane, propane, power cycle fluid, etc.). In some embodiments, the second fluid is used to drive a turbine.

In some embodiments, PX 310 is to receive the first fluid at a high pressure (e.g., HP fluid in 130 of FIGS. 1A-1B). In some embodiments, PX 310 receives the first fluid at a pressure between about 150 bar and 250 bar. PX 310 may receive the first fluid via a high pressure inlet (e.g., HPin). In some embodiments, PX 310 is to receive the second fluid at a low pressure (e.g., LP fluid in 120 of FIGS. 1A-B). In some embodiments, PX 310 receives the second fluid at a pressure between about 50 bar and 100 bar. PX 310 may receive the second fluid via a low pressure inlet (e.g., LPin). Although there is a reference to "high pressure" and "low pressure," "high pressure" and "low pressure" may be relative to one another and may not connote certain pressure values (e.g., the pressure of the HP fluid in 130 is higher than the pressure of LP fluid in 120). PX 310 may exchange pressure between the first fluid and the second fluid. In some embodiments, PX 310 compresses the second fluid using the high pressure first fluid. PX 310 may provide the first fluid via a low pressure outlet (e.g., LP fluid out 140, LPout) and may provide the second fluid via a high pressure outlet (e.g., HP fluid out 150, HPout). In some embodiments, the first fluid provided via the low pressure outlet is at a low pressure and the second fluid provided via the high pressure outlet is at a high pressure. In some embodiments, the first fluid is provided via the low pressure outlet between about 50 bar and 100 bar. In some embodiments, the second fluid is provided via the high pressure outlet between about 150 bar and 250 bar. In some embodiments, PX 310 compresses the second fluid from a low pressure subcritical state to a high pressure supercritical state (e.g., to a temperature and pressure above the critical point of the second fluid). In some embodiments, PX 310 increases pressure of the second fluid already in a supercritical state. In some embodiments, a supercritical fluid (e.g., a fluid in a supercritical state) is a fluid at a temperature and pressure above the critical point, where distinct liquid and gas phases do not exist. In some embodiments, PX 310 increases the pressure of the second fluid from a low pressure subcritical liquid state to a high pressure subcritical liquid state. In some embodiments, PX 310 act as a pump (e.g., rather than a compressor). In some embodiments, PX310 increases the pressure of the second fluid from a low pressure subcritical liquid state to a high pressure supercritical state. In some embodiments, the operational mode of the PX 310 (e.g., whether the second fluid is in a subcritical state or in a supercritical state) is determined by the thermodynamic cycle optimization in order to maximize cycle efficiency and reduce cost of the equipment.

In some embodiments, geothermal power generation system 300A includes a primary heat exchanger (HX) 326. In some embodiments, the primary HX 326 is to transfer geothermal heat from a first fluid (e.g. water, brine, geothermal fluid, etc.) at high pressure to second fluid (e.g. a process fluid, $CO_2$, etc.) at low temperature to increase the temperature of the second fluid before the second fluid enters the turbine 328. Primary heat exchanger 326 may receive hot geothermal fluid and high pressure process fluid (e.g., high pressure gaseous $CO_2$, high pressure liquid $CO_2$ or high pressure supercritical $CO_2$, etc.). In some embodiments, the primary heat exchanger 326 receives first fluid at a temperature between about 180° C. and about 200° C. In some embodiments, the primary heat exchanger 326 receives second fluid at a temperature between about 50° C. and about 100° C. In some embodiments, the primary heat exchanger 326 is configured to exchange corresponding thermal energy between the first fluid and the second fluid. In some embodiments, the second fluid is heated within the primary heat exchanger 326 by the first fluid. In some embodiments, the first fluid is cooled in the primary heat exchanger 326. The cooled first fluid may flow from the primary heat exchanger 326 to the re-injection well 304 where the cooled first fluid may be re-injected back into the hot aquifer 334. In some embodiments, the second fluid is heated within the primary heat exchanger 326 to a temperature between about 170° C. and 190° C.

In some embodiments, the heated second fluid from the primary heat exchanger 326 is provided to the turbine 328. The turbine 328 may be configured to flow a supercritical fluid, such as supercritical CO$_2$. The second fluid may expand over the blades of the turbine 328 and cause the turbine blades and shaft to spin. In some embodiments, a generator 330 coupled to the turbine shaft is caused to spin and electricity may be produced. An input shaft of the generator 330 may be mechanically coupled to an output shaft of the turbine 328 so that the input shaft of the generator 330 rotates with the output shaft of the turbine 328. In some embodiments, the generator 330 generates electricity responsive to the turbine converting corresponding thermal energy of the second fluid (e.g., high pressure CO$_2$, supercritical CO$_2$, etc.) into kinetic energy (e.g., rotational kinetic energy). In some embodiments, the second fluid is output from the turbine 328 at a decreased temperature and a decreased pressure. In some embodiments, the second fluid is output from the turbine 328 at a temperature between about 80° C. and 110° C., and at a pressure between about 60 bar and 90 bar. In some embodiments, the second fluid is output from the turbine 328 in a low pressure subcritical gas phase. In some embodiments, the second fluid is output from the turbine 328 in a supercritical state.

In some embodiments, second fluid output from the turbine 328 is provided to a recuperator 332 (e.g., heat exchanger, secondary heat exchanger). In some embodiments, the recuperator 332 is to extract any remaining thermal energy after expansion through turbine 328 and transfer residual thermal energy to the fluid stream that is heated in the primary HX 326. This may reduce the amount of heat needed to be added in the primary HX for a given power output from the turbine 328 and thus may increase the efficiency of the power cycle. In some embodiments, recuperator 332 is a heat exchanger that exchanges thermal energy between two flows of fluid (e.g., a high temperature flow and a low temperature flow). Low pressure second fluid exiting the turbine 328 may have some residual thermal energy and may have a temperature warmer than that of the high pressure second fluid flowing from the PX 310. To extract the above-described residual thermal energy, second fluid output from the turbine 328 is flowed through the recuperator 332 to exchange corresponding thermal energy with high pressure second fluid received from the PX 310. Second fluid input to the primary heat exchanger 326 may be heated (e.g., by the second fluid output from the turbine 328) in the recuperator 332. The second fluid received from the PX 310 may be heated in the recuperator 332 before being input to the primary heat exchanger 326. In some embodiments, second fluid received from the turbine 328 is output from the recuperator 332 at a temperature between about 30° C. and about 50° C.

In some embodiments, a gas cooler 318 receives second fluid output from the recuperator 332 to further cool the second fluid. Heat not recovered from the second fluid in the recuperator 332 may be rejected to a corresponding environment (e.g., an ambient environment, etc.) via the gas cooler 318. In some embodiments, the gas cooler 318 is to act as a thermal sink for the power cycle. The gas cooler may increase the density of the second fluid entering the LPin port of the PX 310 and into the suction of the compressor 322. Increasing the density of the second fluid entering the PX 310 (e.g., via the LPin port) may increase the efficiency of the power cycle. In some embodiments, lowering the temperature at which the heat is rejected (e.g., via the gas cooler 318) may increase the Carnot efficiency of the power cycle. In some embodiments, the gas cooler 318 uses air or cooling liquid (e.g., cooling water, etc.) to cool the second fluid. One or more fans may blow air through cooling channels of the gas cooler 318 to cool the second fluid. In some embodiments, second fluid cooled in the gas cooler 318 remains in a supercritical state. In some embodiments, second fluid cooled in the gas cooler 318 may be in a subcritical liquid state (e.g., see FIG. 3D and associated description below). In some embodiments, cooled second fluid is output from the gas cooler 318 at a pressure between about 50 bar and about 100 bar and at a temperature between about 15° C. and about 35° C.

In some embodiments, second fluid flowing from the gas cooler 318 is split into two flows by the flow split valve 320. In some embodiments, flow split valve 320 is a three-way valve to divert the flow of second fluid along two flow paths. Flow split valve 320 may be actuatable by a valve actuator. The actuator may actuate the flow split valve 320 based on instructions received from the controller 380. The instructions may be based on sensor data received by the controller 380 from one or more sensors of the geothermal power generation system 300A. In some embodiments, the flow split valve 320 directs at least a portion of second fluid output from the gas cooler 318 toward the low pressure inlet of the PX 310 to exchange pressure with the high pressure first fluid within the PX 310. In some embodiments, the flow split valve 320 directs all of the second fluid output from the gas cooler 318 toward the low pressure inlet of the PX 310 to exchange pressure with the high pressure first fluid within the PX 310 (e.g., bypassing the compressor 322 responsive to PX 310 providing enough pressure exchange). In some embodiments, the flow split valve 320 directs at least a portion of the second fluid output from the gas cooler 318 toward a compressor 322. In some embodiments, the flow split valve 320 directs all of the second fluid output from the gas cooler 318 toward a compressor 322 (e.g., bypassing the PX 310 during maintenance of the PX 310). In some embodiments, the compressor 322 increases pressure of the portion of the second fluid to a pressure similar (e.g., substantially similar) to that of the high pressure second fluid output from the PX 310. In some embodiments, compressed second fluid output from the compressor 322 is combined with high pressure second fluid output from the PX 310 in flow merge valve 324. Flow merge valve 324 may be an actuatable three-way valve actuated based on instructions received from the controller 380. In some embodiments, flow merge valve 324 actuates according to the actuation of flow split valve 320. In some embodiments, system 300A includes a simple pipe junction (e.g., a "T" junction) in place of flow merge valve 324 to merge the two flows.

In some embodiments, only a portion of the second fluid flows through the compressor 322. For example, approximately 70% of the second fluid output from the gas cooler 318 may flow through the PX 310 and approximately 30% of the second fluid may flow through the compressor 322. In another example, approximately 80% of the second fluid may flow through the PX 310 and approximately 20% of the second fluid may flow through the compressor 322. In another example, approximately 90% of the second fluid may flow through the PX 310 and approximately 10% of the second fluid may flow through the compressor 322. In another example, more than 95% of the second fluid may flow through the PX 310 and less than 5% of the second fluid may flow through the compressor 322. In some embodiments, flow through the compressor 322 is determined based on flowrate data and/or pressure data. In some embodiments, a combined flow output from the compressor and the high pressure outlet of the PX 310 is to meet a threshold condition (e.g., a threshold flow rate). Depending upon mass flow rate from the high pressure outlet of the PX 310, more or less fluid may be caused to flow through the compressor 322. For example, if the mass flow rate from the high pressure outlet of the PX 310 is low (e.g., comparatively low), the flow split valve 320 may be actuated to send more fluid through the compressor 322. In another example, if the mass flow rate from the high pressure outlet of the PX 310 is high (e.g., comparatively high, sufficiently high, etc.), the flow split valve 320 may be actuated to send less fluid through the compressor 322.

In Som embodiments, the PX uses pressure energy of the fluid (e.g. water or brine) coming out of the geothermal well to compress the working fluid (e.g. $CO_2$) of the power cycle without consuming external mechanical or electrical energy and thus reduces the energy consumed by the compressor 322 of the power cycle. This may increase the efficiency of the power cycle.

FIG. 3B is a schematic diagram of a geothermal power generation system 300B including a pressure exchanger (PX), according to certain embodiments. In some embodiments, features that have reference numbers that are similar to reference numbers in other figures include similar properties, structures, and/or functionality as those described in other figures. In some examples, features of geothermal power generation system 300B has similar properties, structures, and/or functionality as geothermal power generation system 300A of FIG. 3A.

In some embodiments, geothermal power generation system 300B includes a motor 360 coupled to a rotor of PX 310. Motor 360 may control rotation of a rotor of PX 310. In some embodiments, the motor 360 is to adjust the amount of mass flow that can be compressed (or pumped) by the PX and also to reduce the amount of mixing that may take place between the first fluid (e.g., water, brine, geothermal fluid, etc.) and second fluid (e.g., process fluid, $CO_2$, etc.). In some embodiments, the motor 360 controls the rotational velocity (e.g., angular velocity, rotational speed, etc.) of the PX 310. In some embodiments, the pressure of the second fluid output from the PX 310 may be related to the rotational speed of the PX 310. In some embodiments, a controller (e.g., controller 380) receives sensor data from one or more sensors of motor 360. In some embodiments, motor 360 is an electric motor. In some embodiments, controller 380 controls motor 360. Motor 360 may be controlled based on sensor data associated with high pressure flow output from the high pressure outlet of the PX 310 such as pressure data and/or flow data. In some embodiments, controller 380 receives motor data from one or more motor sensors associated with the motor 360 (e.g., speed sensors, run-time sensors, load sensors, etc.). Motor data received from motor sensors may include current motor speed (e.g., revolutions per minute), total motor run time, motor run time between maintenance operations, and/or total motor revolutions. Motor data may be indicative of a performance state of the motor 360.

FIG. 3C is a schematic diagram of a geothermal power generation system 300C including a pressure exchanger (PX), according to certain embodiments. In some embodiments, features that have reference numbers that are similar to reference numbers in other figures include similar properties, structures, and/or functionality as those described in other figures. In some examples, features of geothermal power generation system 300C has similar properties, structures, and/or functionality as geothermal power generation systems 300A of FIG. 3A or 300B of FIG. 3B.

In some embodiments, hot geothermal fluid is received via the production well 302 from fractured hot rock 335 beneath a layer of subsurface rock. Fractured hot rock 335 may be fractured due to "fracing." In some embodiments, cooled, low pressure geothermal fluid output from the primary heat exchanger 326 is re-injected into the fractured hot rock 335 via the re-injection well 304. In some embodiments, an injection pump 336 increases pressure of the geothermal fluid output from the primary heat exchanger 326 to re-inject the geothermal fluid into the fractured hot rock 335.

Figure 3D:
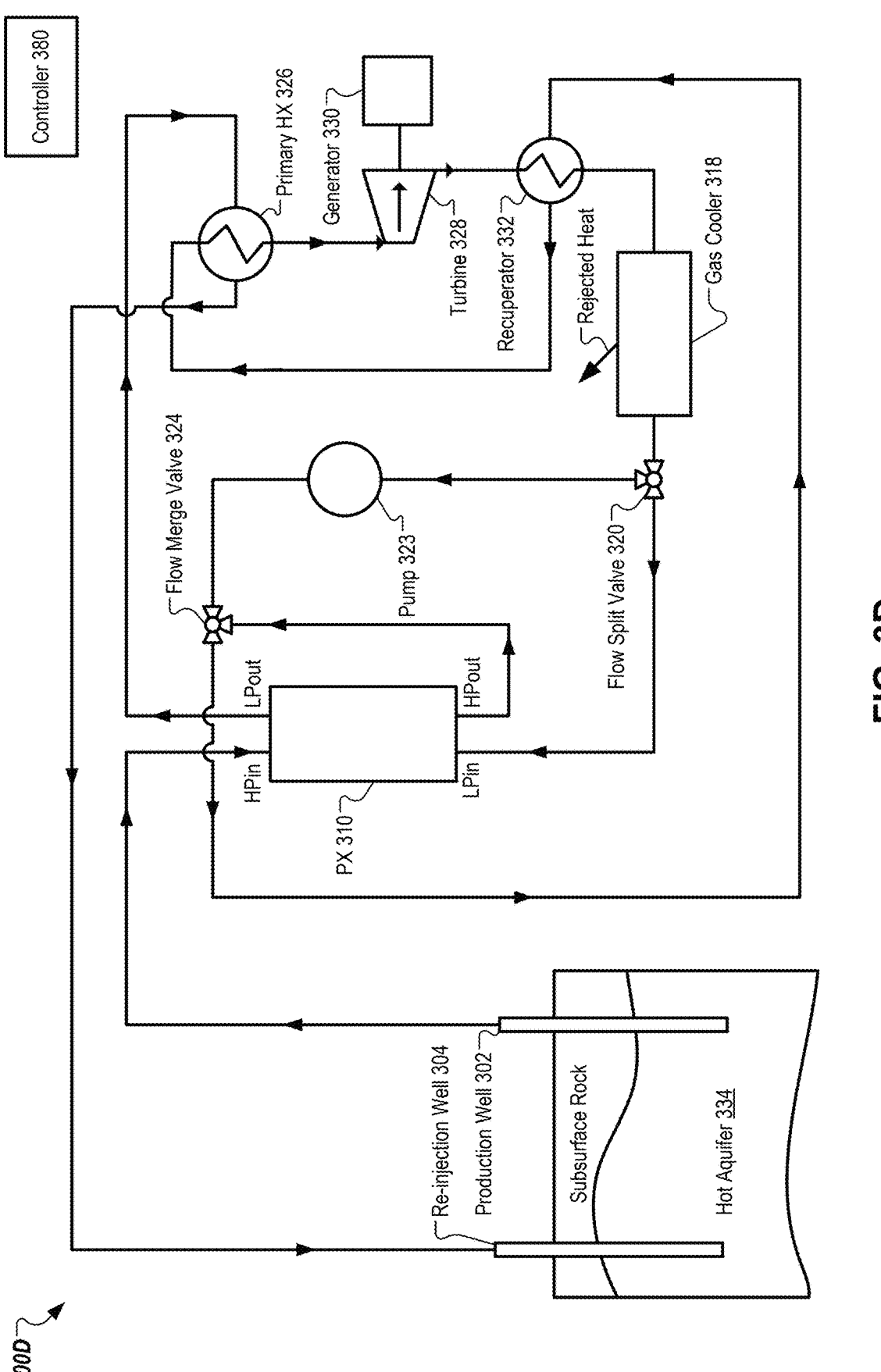

FIG. 3D is a schematic diagram of a geothermal power generation system 300D including a pressure exchanger (PX), according to certain embodiments. In some embodiments, features that have reference numbers that are similar to reference numbers in other figures include similar properties, structures, and/or functionality as those described in other figures. In some examples, features of geothermal power generation system 300D has similar properties, structures, and/or functionality as geothermal power generation systems 300A of FIG. 3A, 300B of FIG. 3B, or 300C of FIG. 3C.

In some embodiments, (e.g., where the fluid in the gas cooler 318 is in a subcritical liquid state), system 300D may include a pump 323. In some embodiments, PX 310 acts as a compressor and/or a pump. For example, PX 310 can handle both the supercritical state of fluid at a first inlet (e.g., LPin) and the subcritical liquid state at the first inlet. In some embodiments, using a pump 323 instead of a compressor (e.g., compressor 322 of FIGS. 3A-3C) may allow the power cycle operate in a "trans-critical" mode where the second fluid ($CO_2$) is pumped from low pressure subcritical liquid state to high pressure liquid state using PX 310 and using the pump 323. The heat added in the primary HX 326 may convert $CO_2$ from high pressure liquid state to high pressure supercritical state. In some embodiments, both pressure and temperature of working fluid exiting the primary HX 326 are above the critical point. In some embodiments, the energy consumed by a pump is smaller than energy consumed by a compressor, which may reduce the energy required for increasing the pressure of working fluid (e.g., $CO_2$) from low pressure to high pressure.

Figure 4:
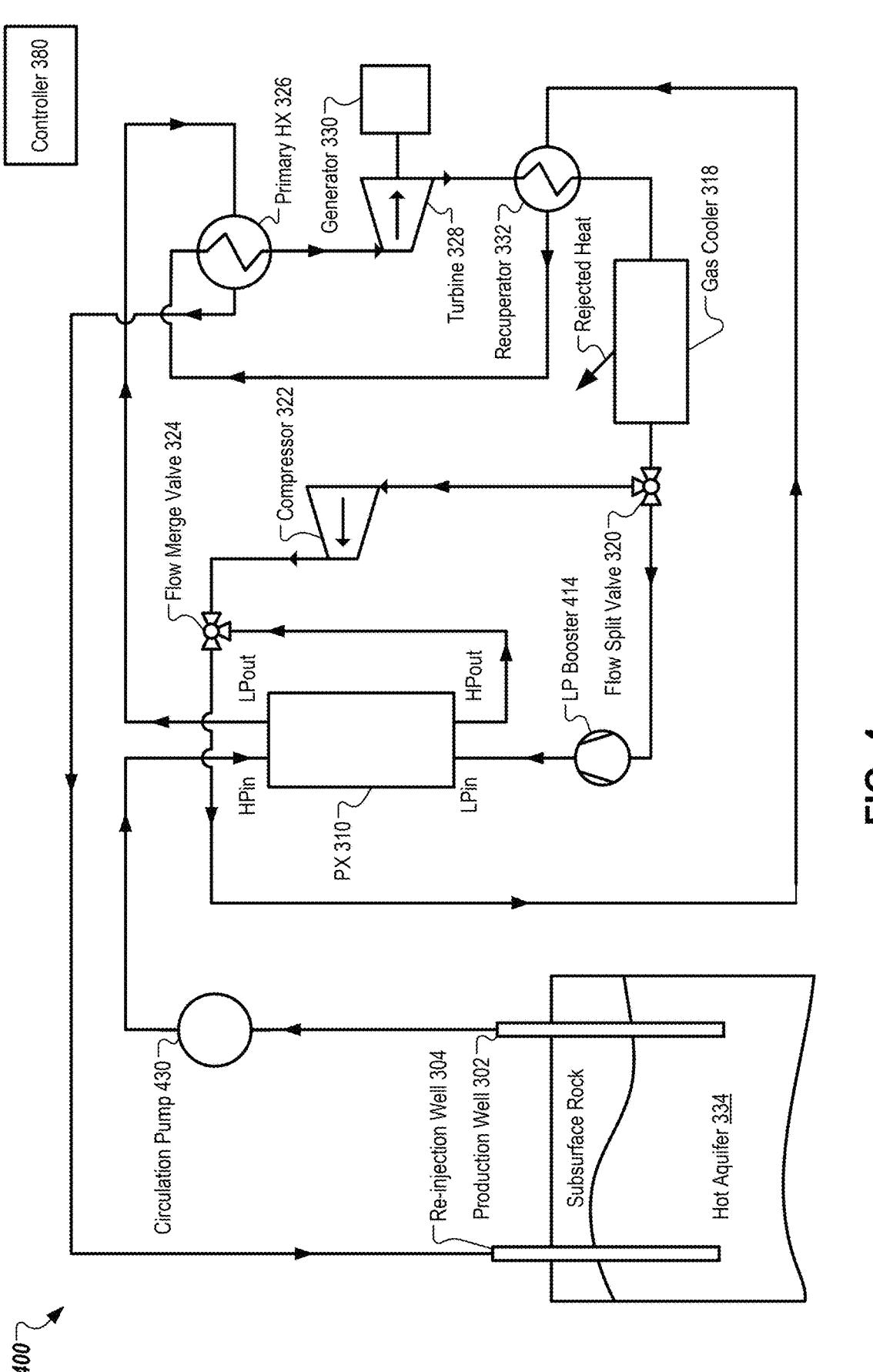
FIG. 4 is a schematic diagram of a geothermal power generation system including a PX, according to certain embodiments.

FIG. 4 is a schematic diagram of a geothermal power generation system 400 including a PX, according to certain embodiments. In some embodiments, features that have reference numbers that are similar to reference numbers in other figures include similar properties, structures, and/or functionality as those described in other figures. In some examples, features of geothermal power generation system 400 has similar properties, structures, and/or functionality as geothermal power generation systems 300A-300C of FIGS. 3A-3C.

In some embodiments, geothermal power generation system 400 includes a circulation pump 430. In some embodiments, circulation pump 430 increases pressure of geothermal fluid received from the hot aquifer 334 to overcome pressure losses within the system (e.g., geothermal power generation system 400). In some embodiments, circulation pump 430 pumps geothermal fluid to maintain a consistent (e.g., substantially consistent) flow rate of geothermal fluid from the hot aquifer 334. In some embodiments, circulation pump 430 is controlled by controller 380. For example, controller 380 can send instructions to a motor (e.g., a motor controller) associated with the circulation pump 430 to increase or decrease output of the circulation pump 430 to meet the flow or pressure demands of the system.

In some embodiments, geothermal power generation system 400 includes a low pressure booster 414 to increase pressure of the second fluid (e.g., the process fluid, supercritical $CO_2$, etc.) and to provide the second fluid to the PX 310. In some embodiments, the low pressure booster 414 increases pressure of the low pressure second fluid to overcome pressure losses in the system (e.g., geothermal power generation system 400). In some embodiments, low pressure booster 414 is a compressor. In some embodiments, low pressure booster 414 is a pump (e.g., see FIG. 5B). In some embodiments, the low pressure booster 414 flows the low pressure second fluid to maintain a consistent (e.g., substantially consistent) flow rate of second fluid to the PX 310. In some embodiments, the low pressure booster 414 flows the low pressure second fluid to provide an optimal mass flow rate of second fluid into the PX 310. For example, the low pressure booster 414 flows supercritical $CO_2$ so that the rotor channels of the PX 310 are optimally filled (e.g., nearly fully filled) with $CO_2$ during operation to maintain optimal operation of the PX 310. In some embodiments, low pressure booster 414 is controlled by controller 380. For example, controller 380 can send instructions to a motor (e.g., a motor controller) associated with the low pressure booster 414 to increase or decrease pressure or flow output of the low pressure booster 414 to meet the flow or pressure demands of the system.

Figure 5A:
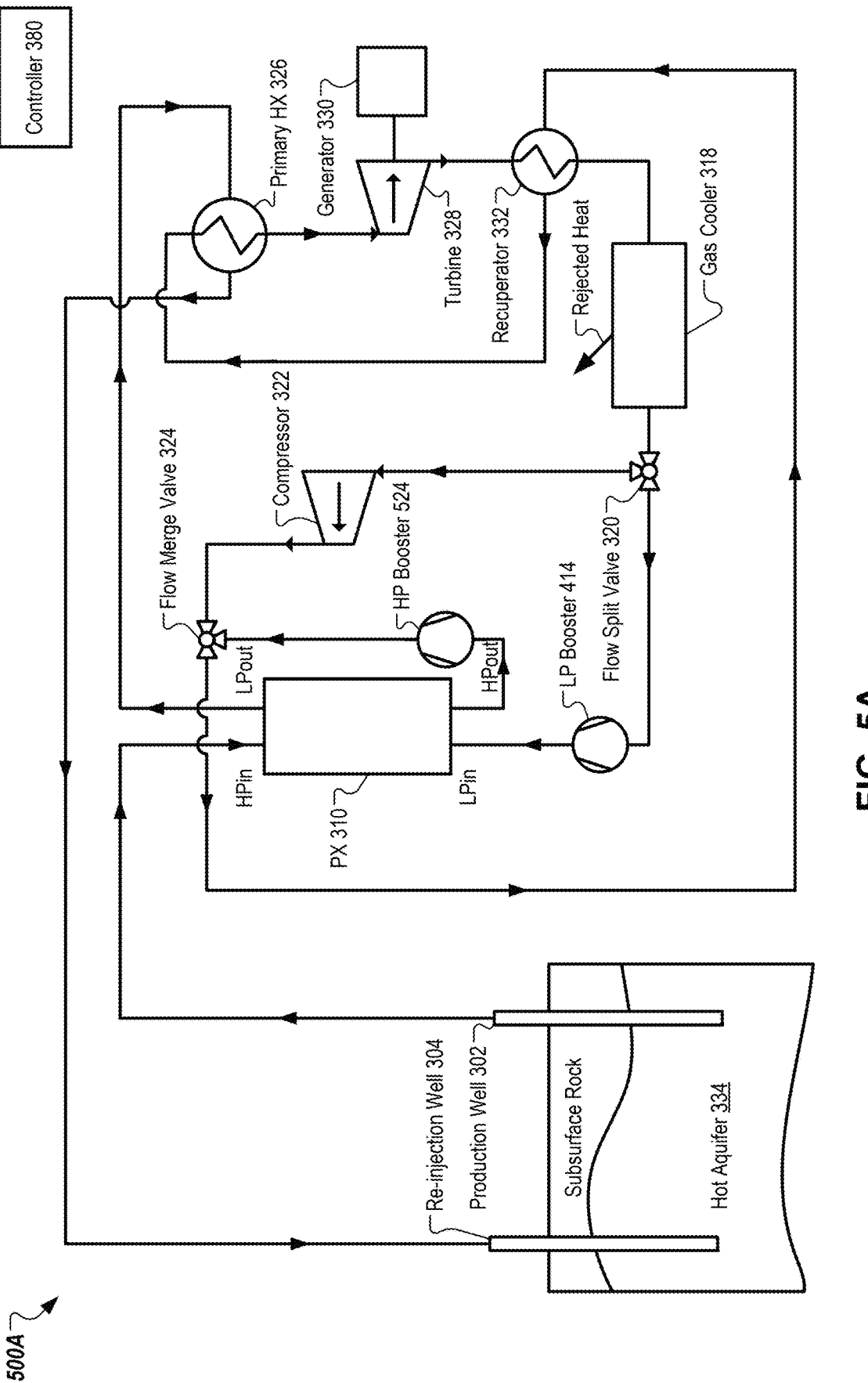
FIGS. 5A-5B are schematic diagrams of geothermal power generation systems including a PX, according to certain embodiments.

FIG. 5A is a schematic diagram of a geothermal power generation system 500A including a PX, according to certain embodiments. In some embodiments, features that have reference numbers that are similar to reference numbers in other figures include similar properties, structures, and/or functionality as those described in other figures. In some examples, features of geothermal power generation system 500A has similar properties, structures, and/or functionality as geothermal power generation systems 300A-400 of FIGS. 3A-4.

In some embodiments, geothermal power generation system 500A includes a high pressure booster 524. In some embodiments, high pressure booster 524 is a compressor. In some embodiments, high pressure booster 524 is a pump (e.g., see FIG. 5B). High pressure booster 524 may receive high pressure second fluid from the PX 310 and provide the second fluid to the flow merge valve 324. In some embodiments, output from high pressure booster is combined with output from compressor 322. In some embodiments, high pressure booster 524 increases pressure of the second fluid received from the HPout port of PX 310 by a small amount. In some examples, the high pressure booster 524 may increase pressure of the second fluid less than about 50 pounds per square inch (PSI). The high pressure booster 524 may increase pressure of the second fluid to overcome flow resistance and/or pressure losses in the system. The high pressure booster 524 cause the second fluid to have a consistent (e.g., substantially consistent) flow rate (e.g., mass flow rate) of high pressure $CO_2$ to the turbine 328. In some embodiments, high pressure booster 524 is controlled by controller 380. For example, controller 380 can send instructions to a motor (e.g., a motor controller) associated with the high pressure booster 524 to increase or decrease pressure output of the high pressure booster 524 to meet the flow or pressure demands of the system.

Figure 5B:
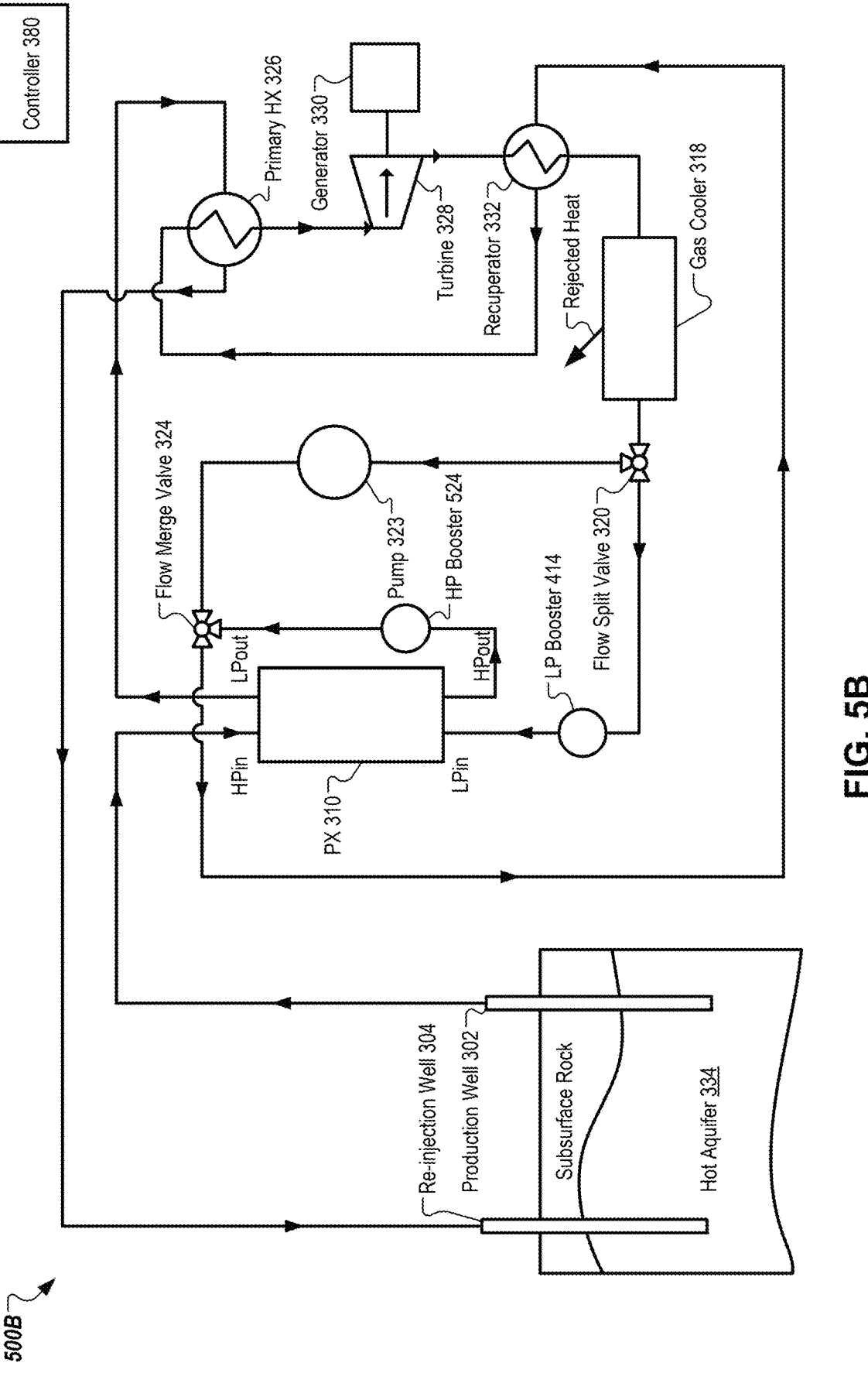

FIG. 5B is a schematic diagram of a geothermal power generation system 500B including a PX, according to certain embodiments. In some embodiments, features that have reference numbers that are similar to reference numbers in other figures include similar properties, structures, and/or functionality as those described in other figures. In some examples, features of geothermal power generation system 500B has similar properties, structures, and/or functionality as geothermal power generation systems 300A-500A of FIGS. 3A-5A.

In some embodiments, HP booster 524 is a pump to receive high pressure second fluid in a liquid state from the PX 310 and provide the second fluid (e.g., at an increased pressure in a liquid state) to the flow merge valve 324. In some embodiments, LP booster 414 is a pump to receive low pressure second fluid in a liquid state and provide the second fluid (e.g., at an increased pressure in a liquid state) to the low pressure inlet of the PX 310.

Figure 6:
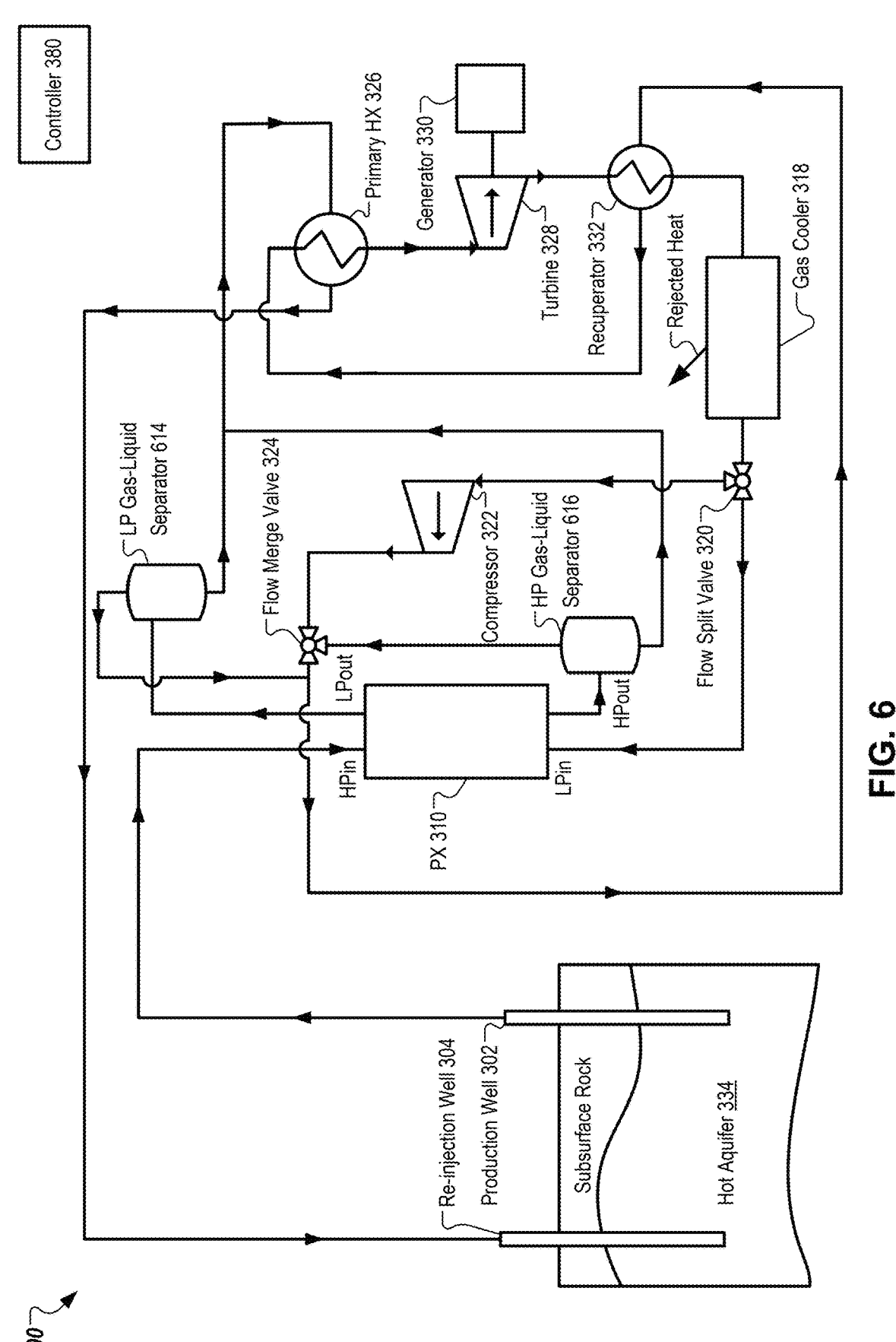
FIG. 6 is a schematic diagram of a geothermal power generation system including a PX, according to certain embodiments.

FIG. 6 is a schematic diagram of a geothermal power generation system 600 including a PX, according to certain embodiments. In some embodiments, features that have reference numbers that are similar to reference numbers in other figures include similar properties, structures, and/or functionality as those described in other figures. In some examples, features of geothermal power generation system 600 has similar properties, structures, and/or functionality as geothermal power generation systems 300A-500 of FIGS. 3A-5B.

In some embodiments, geothermal power generation system 600 includes a low pressure gas-liquid separator 614 (e.g., low pressure flash tank, low pressure receiver) and a high pressure gas-liquid separator 616 (e.g., high pressure flash tank, low pressure receiver). Low pressure gas-liquid separator 614 may be a receiver having a chamber to receive fluid and cause the separation of the fluid into gas and liquid. In some embodiments, gas-liquid separators 614 and 616 may be "cyclonic" separators which separate the fluids through a centrifugal motion of the fluid. In some embodiments, in a cyclonic separator, the higher density fluid is propelled further radially outward compared to the lower density fluid during centrifugal motion of the mixed fluid within the separator and is captured in a separate compartment within the separator. In some embodiments, the low pressure gas-liquid separator 614 may receive at least low pressure first fluid (e.g., low pressure geothermal fluid, etc.) output from the low pressure outlet of the PX 310. In some embodiments, the low pressure gas-liquid separator 614 may receive at least some second fluid (e.g., at least some $CO_2$, etc.) that mixed with the first fluid in the PX 310. In some embodiments, mixing of the first fluid and the second fluid can be reduced and/or eliminated by spinning a rotor of PX 310 faster. Fluid received into the chamber of the low pressure gas-liquid separator 614 may separate into a liquid and a gas. The liquid (e.g., geothermal fluid, etc.) may fall to the bottom of the chamber and the gas (e.g., $CO_2$, etc.) may rise to the top.

In some embodiments, the second fluid (e.g., process fluid, $CO_2$, etc.) that is mixed with the first fluid can be in the supercritical state but will still separate in gas-liquid separators 614 and 616 due to density difference compared to the first fluid. In some embodiments, such as in the case of a trans-critical cycle, the second fluid may be in a liquid state similar to a liquid state of the first fluid. casein some embodiments, the gas-liquid separators 614 and 616 may act as liquid-liquid separators because the density of the second fluid (in a liquid state) may be different than the density of the first fluid (in a liquid state) and thus may be separated from the top of the separator. Separating gas and liquid in the low pressure gas-liquid separator 614 may prevent loss of second fluid from the system as any small amount of second fluid that is separated in the separator 614 is sent back into the second fluid loop. In some embodiments, gas may flow from the top of the low pressure gas-liquid separator 614 to the flow of high pressure second fluid (e.g., high pressure $CO_2$, etc.) output from the PX 310 and to the primary heat exchanger 326. In some embodiments, liquid (e.g., hot geothermal fluid, etc.) may flow from the bottom of the low pressure gas-liquid separator 614 to the primary heat exchanger 326.

High pressure gas-liquid separator 616 may be a receiver having a chamber to receive fluid and cause the separation of the fluid into gas and liquid. In some embodiments, the high pressure gas-liquid separator 616 may receive at least high pressure second fluid (e.g., high pressure $CO_2$, etc.) output from the high pressure outlet of the PX 310. In some embodiments, the high pressure gas-liquid separator 616 may receive at least some first fluid (e.g., at least some geothermal fluid, etc.) that mixed with the second fluid in the PX 310. Fluid received into the chamber of the high pressure gas-liquid separator 616 may separate into a liquid and a gas. The liquid (e.g., geothermal fluid, etc.) may fall to the bottom of the chamber and the gas (e.g., $CO_2$, etc.) may rise to the top. Separating gas and liquid in the high pressure gas-liquid separator 616 may prevent liquid (e.g., liquid first fluid) from reaching the inlet to the turbine 328. In some embodiments, gas may flow from the top of the high pressure gas-liquid separator 616 to the flow merge valve 324 and to the primary heat exchanger 326. In some embodiments, liquid (e.g., hot geothermal fluid, etc.) may flow from the bottom of the high pressure gas-liquid separator 616 to the flow of low pressure first fluid output from the PX 310 and to the primary heat exchanger 326.

Figure 7:
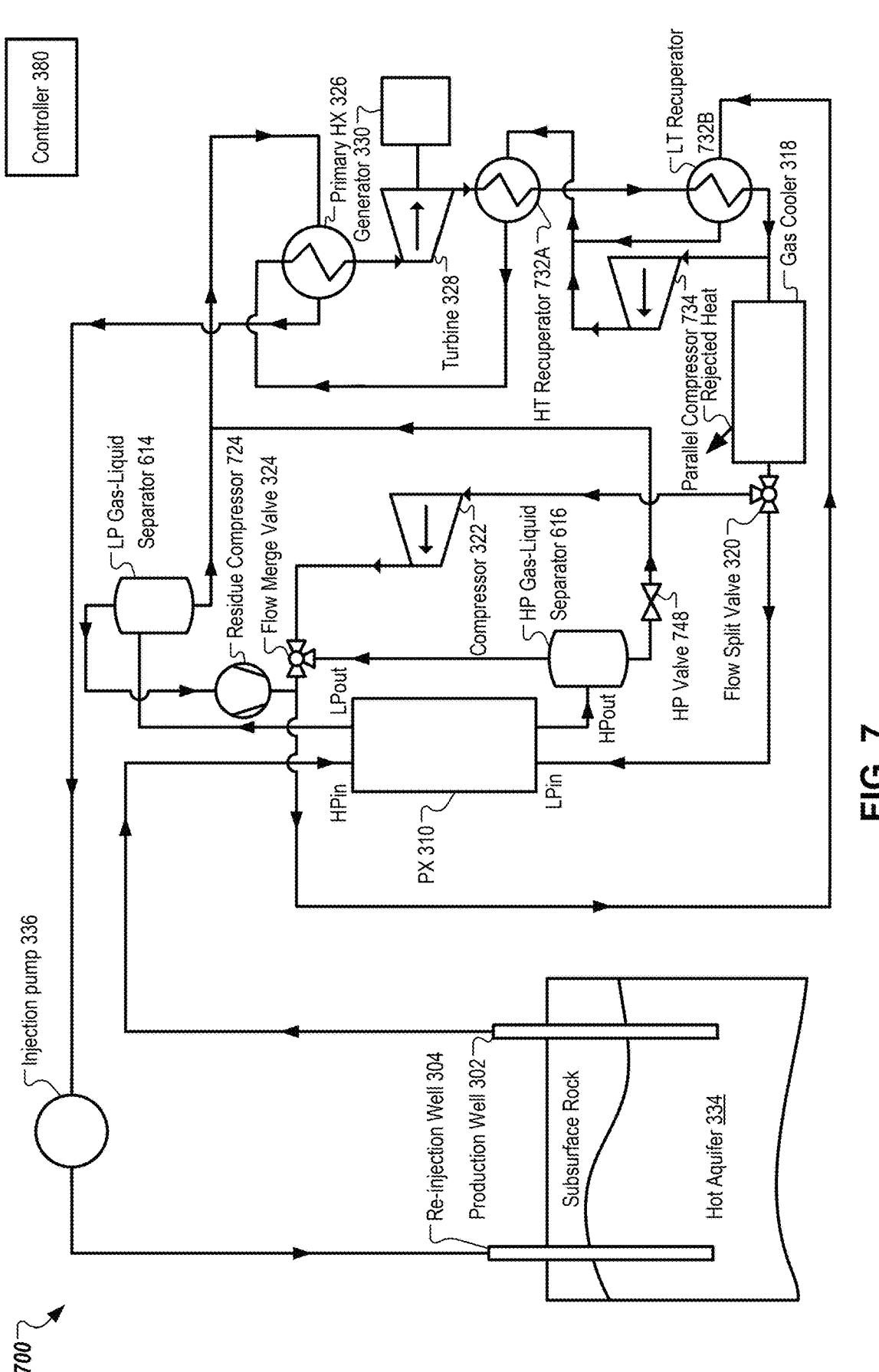
FIG. 7 is a schematic diagram of a geothermal power generation system including a PX, according to certain embodiments.

FIG. 7 is a schematic diagram of a geothermal power generation system 700 including a PX, according to certain embodiments. In some embodiments, features that have reference numbers that are similar to reference numbers in other figures include similar properties, structures, and/or functionality as those described in other figures. In some examples, features of geothermal power generation system 700 has similar properties, structures, and/or functionality as geothermal power generation systems 300A-600 of FIGS. 3A-6.

In some embodiments, geothermal power generation system 700 includes a residue compressor 724 to increase pressure of gas collected in the low pressure gas-liquid separator 614. Because gas collected in the low pressure gas-liquid separator 614 is at low pressure (e.g., between about 50 bar and about 100 bar) and the high pressure second fluid output from the PX 310 is at high pressure (e.g., between about 150 bar and about 250 bar), the residue compressor 724 may increase pressure of the gas to overcome the pressure differential so that the gas from the low pressure gas-liquid separator 614 can be combined with output from the compressor 322 and the PX 310 (e.g., injected into the high pressure stream of second fluid). In some embodiments, the residue compressor 724 may flow trace amounts of gas collected in the low pressure gas-liquid separator 614. In some embodiments, residue compressor 724 is controlled by controller 380. For example, controller 380 can send instructions to a motor (e.g., a motor controller) associated with the residue compressor 724 to increase or decrease pressure output of the residue compressor 724 to meet the flow or pressure demands of the system.

In some embodiments, geothermal power generation system 700 includes a high pressure valve 748 to decrease pressure of the liquid collected in the high pressure gas-liquid separator 616. The high pressure valve 748 may decrease pressure of the liquid output from the high pressure gas-liquid separator 616 to substantially match the pressure of liquid output from the low pressure gas-liquid separator 614 (e.g., between about 50 bar and 100 bar). In some embodiments, the high pressure valve 748 is controlled by controller 380. For example, controller 380 can send instructions to an actuator associated with the high pressure valve 748 to actuate the high pressure valve 748 open or closed to meet the flow or pressure demands of the system.

In some embodiments, geothermal power generation system 700 includes a high temperature recuperator 732A (e.g., high temperature heat exchanger configured to exchange heat between two flows of working fluid such as $CO_2$, etc.) and a low temperature recuperator 732B (e.g., low temperature heat exchanger configured to exchange heat between two flows of working fluid such as $CO_2$, etc.). High temperature recuperator 732A may receive low pressure second fluid output from the turbine 328 (e.g., low pressure $CO_2$, etc.) and high pressure second fluid (e.g., high pressure $CO_2$, etc.) output from the low temperature recuperator 732B. Low temperature recuperator 732B may receive low pressure second fluid output from the high temperature recuperator 732A and high pressure second fluid output from the PX 310. In some embodiments, the high temperature recuperator 732A is disposed upstream from the low temperature recuperator 732B along the flow of second fluid output from the turbine 328. Corresponding thermal energy may be exchanged between low pressure second fluid and high pressure second fluid at a first temperature (e.g., a high temperature) in the high temperature recuperator 732A and at a second temperature (e.g., a low temperature) in the low temperature recuperator 732B. In some embodiments, a portion of second fluid output from the low temperature recuperator 732B is compressed by the parallel compressor 734 and introduced into the flow of second fluid from the low temperature recuperator 732B to the high temperature recuperator 732A. In some embodiments, the amount of flow going through the parallel compressor 734 may be adjusted to achieve the optimal power cycle design for maximizing power generation efficiency. The portion of second fluid compressed by the parallel compressor 734 may receive heat in the high temperature recuperator 732A. The parallel compressor 734 may be controlled by the controller 380. In some embodiments, the amount of second fluid compressed by the parallel compressor 734 can be varied (e.g., based on instruction from the controller 380) to achieve maximum efficiency of the system (e.g., geothermal power generation system 700) by increasing or decreasing the power supplied to a drive motor coupled to the parallel compressor 734.

Figure 8:
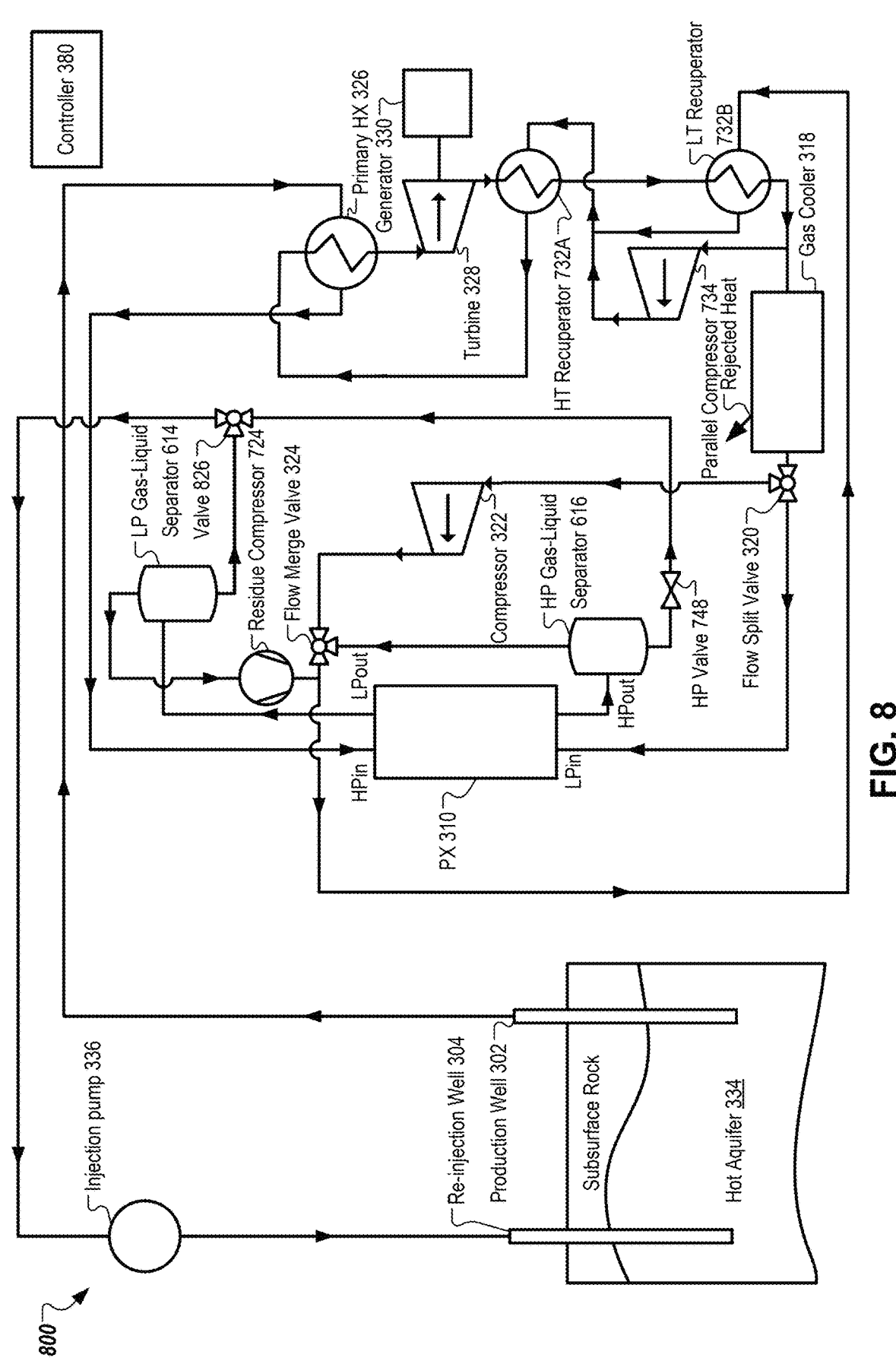
FIG. 8 is a schematic diagram of a geothermal power generation system including a PX, according to certain embodiments.

FIG. 8 is a schematic diagram of a geothermal power generation system 800 including a PX, according to certain embodiments. In some embodiments, features that have reference numbers that are similar to reference numbers in other figures include similar properties, structures, and/or functionality as those described in other figures. In some examples, features of geothermal power generation system 800 has similar properties, structures, and/or functionality as geothermal power generation systems 300A-700 of FIGS. 3A-7.

In some embodiments, the primary heat exchanger 326 receives geothermal fluid from the production well 302 (e.g., rather than from the PX 310 as described above). Corresponding thermal energy may be transferred from the first fluid (e.g., from the geothermal fluid, etc.) to the second fluid (e.g., $CO_2$, etc.) in the primary heat exchanger 326 before the first fluid is supplied to the PX 310. In some embodiments, high pressure first fluid is cooled in the primary heat exchanger 326 before the high pressure first fluid is provided to the high pressure inlet of the PX 310. In some examples, hot, high pressure geothermal fluid from the hot aquifer 334 is too hot to be handled by the PX 310. Therefore, the geothermal fluid may be cooled in the primary heat exchanger 326 (by the high pressure second fluid) before the geothermal fluid enters the PX 310. In some embodiments, exchanging the heat of the first fluid (e.g. hot water, brine, fluid from a geothermal well, geothermal fluid, etc.) in the primary HX 326 before sending the first fluid to PX 310 may increase the power cycle efficiency and may also increase the performance of PX 310.

Figure 9:
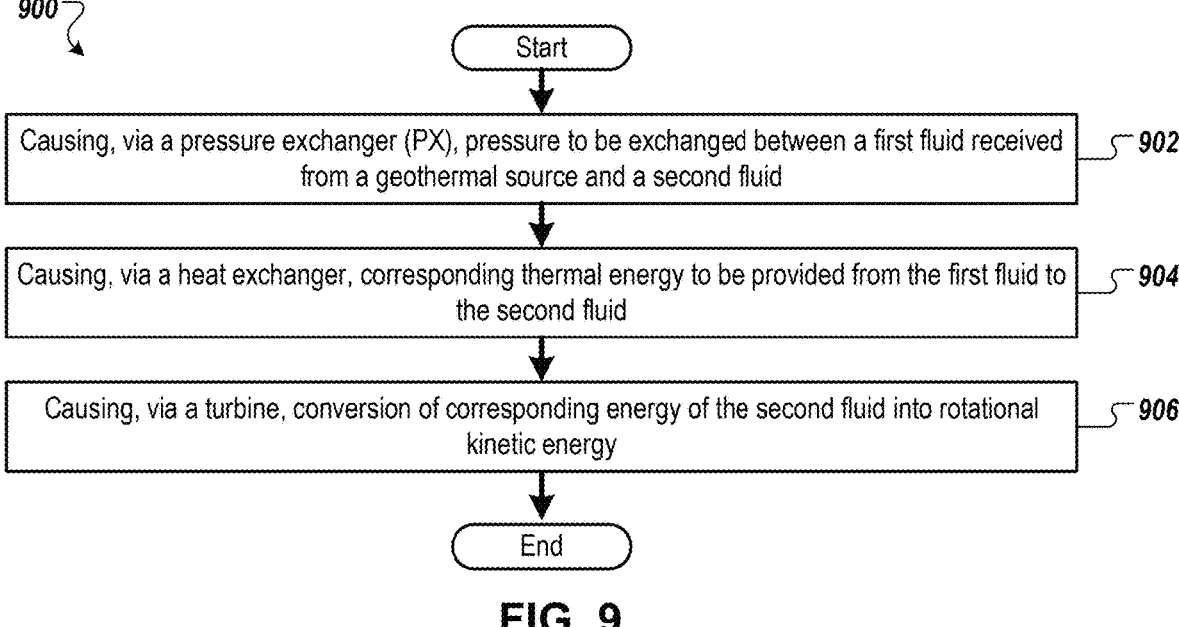
FIG. 9 is a flow diagram illustrating an example method for controlling a geothermal power generation system, according to certain embodiments.

FIG. 9 is a flow diagram illustrating a method 900 for controlling a geothermal power generation system (e.g., one or more of geothermal power generation systems 300A-800 of FIGS. 3A-8), according to certain embodiments. In some embodiments, method 900 is performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 900 is performed, at least in part, by a controller (e.g., controller 180 of FIGS. 1A-B, controller 380 of FIGS. 3A-8). In some embodiments, a non-transitory storage medium stores instructions that when executed by a processing device (e.g., of controller 180 of FIGS. 1A-B, controller 380 of FIGS. 3A-8), cause the processing device to perform method 900.

For simplicity of explanation, method 900 is depicted and described as a series of operations. However, operations in accordance with this disclosure can occur in various orders and/or concurrently and with other operations not presented and described herein. Furthermore, in some embodiments, not all illustrated operations are performed to implement method 900 in accordance with the disclosed subject matter. In addition, those skilled in the art will understand and appreciate that method 900 could alternatively be represented as a series of interrelated states via a state diagram or events.

At block 902, processing logic may cause pressure to be exchanged between a first fluid (e.g., water and/or brine) received from a geothermal source (e.g., hot aquifer 334) and a second fluid (e.g., $CO_2$) via a pressure exchanger (e.g., PX 310). In some examples, processing logic (e.g., of controller 380) may cause a pressure exchanger to operate to exchange pressure between the first fluid and the second fluid. In some embodiments, processing logic may cause one or more valves to open and one or more pumps and/or compressors to provide the first fluid and the second fluid to inlets of the pressure exchanger. The one or more valves may be opened or closed and the one or more pumps and/or compressors may be controlled based on sensor data such as temperature sensor data, flow sensor data, and/or pressure sensor data. Processing logic may cause a compressor and/or a booster (e.g., LP booster 414, circulation pump 430, etc.) to cause the first fluid and the second fluid to flow to the pressure exchanger based on sensor data (e.g., temperature sensor data, pressure sensor data, flowrate sensor data, etc.). The first fluid may be provided to a first inlet of the pressure exchanger at a first pressure and the second fluid may be provided to a second inlet of the pressure exchanger at a second pressure. The first pressure may be higher than the second pressure. In some embodiments (e.g., in embodiments where the pressure exchanger is a rotary pressure exchanger), processing logic may cause a motor (e.g., motor 360) to turn a rotor of the pressure exchanger. Providing the first and second fluids to the inlets of the pressure exchanger via the compressor and/or booster, and/or turning the pressure exchanger via a motor may cause pressure to be exchanged between the first and second fluids. The first fluid may exit the pressure exchanger via a first outlet at a third pressure and the second fluid may exit the pressure exchanger via a second outlet at a fourth pressure. The third pressure may be lower than the fourth pressure.

At block 904, processing logic may cause corresponding thermal energy to be provided from the first fluid to the second fluid via a heat exchanger. The second fluid may be a working fluid or a power cycle fluid such as $CO_2$ (e.g., supercritical $CO_2$, etc.). In some examples, processing logic (e.g., of controller 380) may cause one of systems 300A-800 to operate to reject heat from geothermal fluid to power cycle fluid via primary heat exchanger 326. The processing logic may actuate one or more valves, cause one or more pumps or compressor to operate, and/or cause a pressure exchanger to operate. In some embodiments, the first fluid may be caused to flow through a heat exchanger (e.g., primary heat exchanger 326). The first fluid may be at a first temperature upon entering the heat exchanger and may be at a second (e.g., lower) temperature upon exiting the heat exchanger. The heat exchanger may facilitate heat transfer from the first fluid to the second fluid to increase the temperature of the second fluid and/or to decrease the temperature of the first fluid.

At block 906, processing logic may cause the conversion of corresponding thermal energy and/or kinetic energy of the second fluid into rotational kinetic energy via a turbine (e.g., turbine 328). In some examples, processing logic (e.g., of controller 380) may cause power cycle fluid (e.g., second fluid, $CO_2$, supercritical $CO_2$, etc.) to flow through turbine 328. The processing logic may actuate one or more valves, cause one or more pumps or compressors to operate, and/or cause a pressure exchanger to operate. The turbine (e.g., turbine 328) may be configured to receive the power cycle fluid output from the heat exchanger (e.g., primary heat exchanger 326). Thermal energy of the second fluid provided to the turbine may be converted into kinetic energy (e.g., rotational kinetic energy). The turbine may in turn spin a generator (e.g., generator 330) to produce electricity. In some embodiments, the kinetic energy of the turbine can be used for any work or power generation. The fluid output from the turbine may be routed back to the heat exchanger via one or more additional heat exchangers, compressors, and/or a pressure exchanger.

Figure 10:
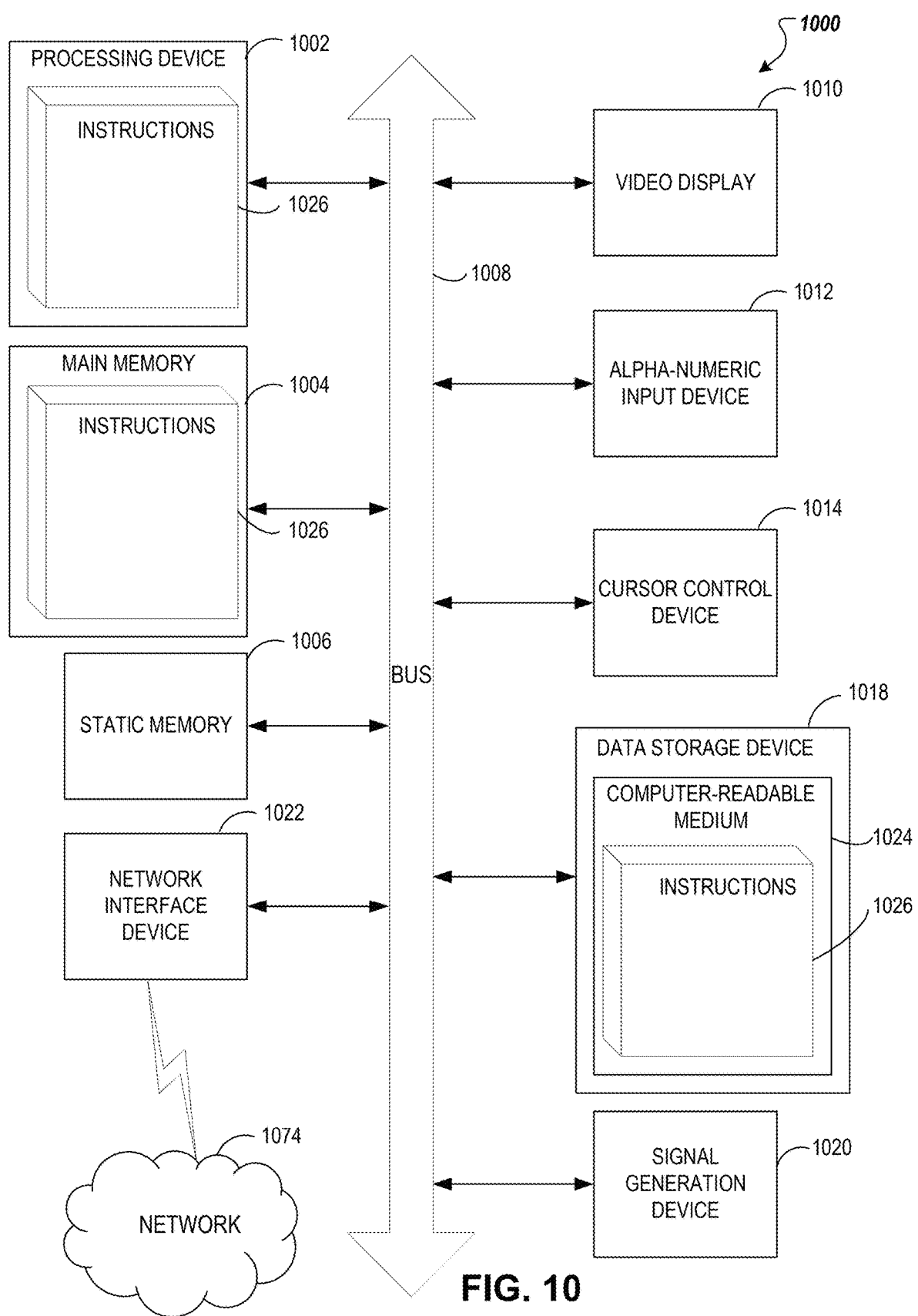
FIG. 10 is a block diagram illustrating a computer system, according to certain embodiments.

FIG. 10 is a block diagram illustrating a computer system 1000, according to certain embodiments. In some embodiments, the computer system 1000 is a client device. In some embodiments, the computer system 1000 is a controller device (e.g., server, controller 180 of FIGS. 1A-B, controller 380 of FIGS. 3A-8).

In some embodiments, computer system 1000 is connected (e.g., via a network, such as a Local Area Network (LAN), an intranet, an extranet, or the Internet) to other computer systems. Computer system 1000 operates in the capacity of a server or a client computer in a client-server environment, or as a peer computer in a peer-to-peer or distributed network environment. In some embodiments, computer system 1000 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 1000 includes a processing device 1002, a volatile memory 1004 (e.g., Random Access Memory (RAM)), a non-volatile memory 1006 (e.g., Read-Only Memory (ROM) or Electri-cally-Erasable Programmable ROM (EEPROM)), and/or a data storage device 1016, which communicates with each other via a bus 1008.

In some embodiments, processing device 1002 is pro-vided by one or more processors such as a general purpose processor (such as, for example, a Complex Instruction Set Computing (CISC) microprocessor, a Reduced Instruction Set Computing (RISC) microprocessor, a Very Long Instruc-tion Word (VLIW) microprocessor, a microprocessor imple-menting other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor). In some embodiments, processing device 1002 is provided by one or more of a single proces-sor, multiple processors, a single processor having multiple processing cores, and/or the like.

In some embodiments, computer system 1000 further includes a network interface device 1022 (e.g., coupled to network 1074). In some embodiments, the computer system 1000 includes one or more input/output (I/O) devices. In some embodiments, computer system 1000 also includes a video display unit 1010 (e.g., a liquid crystal display (LCD)), an alphanumeric input device 1012 (e.g., a key-board), a cursor control device 1014 (e.g., a mouse), and/or a signal generation device 1020.

In some implementations, data storage device 1018 (e.g., disk drive storage, fixed and/or removable storage devices, fixed disk drive, removable memory card, optical storage, network attached storage (NAS), and/or storage area-net-work (SAN)) includes a non-transitory computer-readable storage medium 1024 on which stores instructions 1026 encoding any one or more of the methods or functions described herein, and for implementing methods described herein.

In some embodiments, instructions 1026 also reside, completely or partially, within volatile memory 1004 and/or within processing device 1002 during execution thereof by computer system 1000, hence, volatile memory 1004 and processing device 1002 also constitute machine-readable storage media, in some embodiments.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any com-bination of hardware devices and computer program com-ponents, or in computer programs.

Unless specifically stated otherwise, terms such as "actu-ating," "adjusting," "causing," "controlling," "determining," "identifying," "providing," "receiving," "flowing," or the like, refer to actions and processes performed or imple-mented by computer systems that manipulates and trans-forms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose com-puter system selectively programmed by a computer pro-gram stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The preceding description sets forth numerous specific details, such as examples of specific systems, components, methods, and so forth, in order to provide a good under-standing of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclo-sure. Thus, the specific details set forth are merely exem-plary. Particular implementations may vary from these exemplary details and still be contemplated to be within the scope of the present disclosure.

Reference throughout this specification to "one embodi-ment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about," "substantially," or "approximately" is used herein, this is intended to mean that the nominal value presented is precise within +10%. Also, the terms "first," "second," "third," "fourth," etc. as used herein are meant as labels to distinguish among different elements and can not necessarily have an ordinal meaning according to their numerical designation.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which each claim is entitled.

What is claimed is:

1. A system, comprising:
a pressure exchanger (PX) configured to receive a first fluid at a first pressure via a first inlet of the PX from a geothermal source, receive a second fluid at a second pressure via a second inlet of the PX, and exchange pressure between the first fluid and the second fluid, wherein the first fluid is to exit the PX at a third pressure via a first outlet of the PX, and wherein the second fluid is to exit the PX at a fourth pressure via a second outlet of the PX;
a first flow valve configured to receive the second fluid at the fourth pressure and a third fluid at the fourth pressure, wherein the first flow valve is further configured to combine the third fluid with the second fluid;
a first heat exchanger configured to exchange corresponding thermal energy between the first fluid at approximately the third pressure and the second fluid at approximately the fourth pressure; and
a turbine configured to receive the second fluid output from the first heat exchanger and convert corresponding energy of the second fluid into rotational kinetic energy.

2. The system of claim 1, further comprising:
a generator mechanically coupled to the turbine, wherein the generator is configured to generate electricity responsive to the turbine converting corresponding thermal energy of the second fluid into kinetic energy.

3. The system of claim 1, further comprising:
a second heat exchanger configured to receive fluid output from the turbine and provide corresponding thermal energy from the fluid output from the turbine to the second fluid input to the first heat exchanger to increase temperature of the second fluid input to the first heat exchanger.

4. The system of claim 3, further comprising:
a third heat exchanger configured to receive fluid output from the second heat exchanger, the third heat exchanger configured to provide corresponding thermal energy from the fluid output from the second heat exchanger to a corresponding environment.

5. The system of claim 1, further comprising:
a second flow valve configured to provide the second fluid at the second pressure to the PX and to provide the third fluid at the second pressure; and
a compressor or pump configured to receive the third fluid at the second pressure from the second flow valve and increase pressure of the third fluid to the fourth pressure, wherein the first
a flow valve is configured to receive the second fluid at the fourth pressure from the PX and the third fluid at the fourth pressure from the compressor, wherein the first flow valve is further configured to combine the second fluid with the fourth fluid.

6. The system of claim 1, further comprising:
a motor coupled to a rotor of the PX, wherein the motor is configured to control a rotational velocity of the rotor.

7. The system of claim 1, further comprising:
a booster configured to:
receive the second fluid and increase pressure of the second fluid to the second pressure; and
provide the second fluid at the second pressure to the PX via the second inlet; and
a pump configured to:
receive the first fluid from the geothermal source and increase pressure of the first fluid to the first pressure; and
provide the first fluid at the first pressure to the PX via the first inlet.

8. The system of claim 1, further comprising:
a booster configured to:
receive the second fluid from the second outlet of the PX and increase pressure of the second fluid; and
provide the second fluid to be combined with output of a compressor and input to the first heat exchanger.

9. The system of claim 1, further comprising:
a first receiver configured to receive the first fluid from the first outlet of the PX, wherein the first receiver forms a first chamber configured to separate the first fluid into a first gas and a first liquid; and
a second receiver configured to receive the second fluid from the second outlet of the PX, wherein the second receiver forms a second chamber configured to separate the second fluid into a second gas and a second liquid.

10. The system of claim 9, further comprising:
a first compressor configured to:
receive the first gas from the first receiver and increase pressure of the first gas; and
provide the first gas to be combined with output of a second compressor and input to the first heat exchanger.

11. The system of claim 1, further comprising:

a second heat exchanger configured to receive the second fluid output from the turbine and provide corresponding thermal energy from the second fluid to a fourth fluid to increase temperature of the fourth fluid;

a third heat exchanger configured to receive the second fluid output from the second heat exchanger and provide corresponding thermal energy from the second fluid to the fourth fluid to increase temperature of the fourth fluid; and a compressor configured to receive at least a portion of the second fluid output from the third heat exchanger, increase pressure of the at least a portion of the second fluid, and provide the at least a portion of the second fluid to be combined with the fourth fluid to form the fourth fluid.

12. The system of claim 1, wherein the first heat exchanger is configured to:

receive the first fluid output from the PX at the third pressure; or receive the first fluid from the geothermal source and provide the first fluid to the PX at the first pressure.

13. The system of claim 1, wherein the second fluid comprises one or more of carbon dioxide ($CO_2$), a hydrofluorocarbon, or a hydrocarbon.

14. The system of claim 1, wherein the first pressure is higher than the second pressure, and wherein the third pressure is lower than the fourth pressure.

15. A method, comprising:

causing, via a pressure exchanger (PX) pressure to be exchanged between a first fluid received from a geothermal source and a second fluid, wherein the PX is to decrease pressure of the first fluid from a first pressure to a third pressure and increase pressure of the second fluid from a second pressure to a fourth pressure;

causing, via a first flow valve configured to receive the second fluid at the fourth pressure and a third fluid at the fourth pressure, the third fluid to be combined with the second fluid;

causing, via a first heat exchanger, corresponding thermal energy to be provided from the first fluid at approximately the third pressure to the second fluid at approximately the fourth pressure; and causing, via a turbine, conversion of corresponding energy of the second fluid into rotational kinetic energy.

16. The method of claim 15, wherein the PX is to receive the first fluid at the first pressure via the first inlet of the PX from the geothermal source and the PX is to receive the second fluid at the second pressure via a second inlet of the PX, wherein the PX is to exchange pressure between the first fluid and the second fluid, wherein the first fluid is to exit the PX at the third pressure via a first outlet of the PX, and wherein the second fluid is to exit the PX at the fourth pressure via a second outlet of the PX.

17. The method of claim 15, further comprising:

causing, via a first receiver forming a first chamber, separation of the first fluid output from the PX into a first gas and a first liquid; and causing, via a second receiver forming a second chamber, separation of the second fluid output from the PX into a second gas and a second liquid.

18. A non-transitory computer-readable storage medium comprising instructions that, when executed by a processing device, cause the processing device to perform operations comprising:

causing, via a pressure exchanger (PX) pressure to be exchanged between a first fluid received from a geothermal source and a second fluid, wherein the PX is to decrease pressure of the first fluid from a first pressure to a third pressure and increase pressure of the second fluid from a second pressure to a fourth pressure;

causing, via a first flow valve configured to receive the second fluid at the fourth pressure and a third fluid at the fourth pressure, the third fluid to be combined with the second fluid;

causing, via a first heat exchanger, corresponding thermal energy to be provided from the first fluid at approximately the third pressure to the second fluid at approximately the fourth pressure; and causing, via a turbine, conversion of corresponding energy of the second fluid into rotational kinetic energy.

19. The non-transitory computer-readable storage medium of claim 18, wherein the PX is to receive the first fluid at the first pressure via a first inlet of the PX from the geothermal source and the PX is to receive the second fluid at the second pressure via a second inlet of the PX, wherein the PX is to exchange pressure between the first fluid and the second fluid, wherein the first fluid is to exit the PX at the third pressure via a first outlet of the PX, and wherein the second fluid is to exit the PX at the fourth pressure via a second outlet of the PX.

20. The non-transitory computer-readable storage medium of claim 18, wherein the processing device is to perform operation further comprising:

causing, via a second heat exchanger configured to receive fluid output from the turbine, corresponding thermal energy to be provided from the fluid output from the turbine to a corresponding environment.

* * * * *